US012651300B1

(12) United States Patent
Boyd

(10) Patent No.: US 12,651,300 B1
(45) Date of Patent: Jun. 9, 2026

(54) SYSTEMS AND METHODS FOR ENABLING REMOTE MANAGEMENT OF STORAGE FACILITIES

(71) Applicant: StoreEase, Inc., Homewood, AL (US)

(72) Inventor: Joshua Hamilton Boyd, Birmingham, AL (US)

(73) Assignee: StoreEase, Inc., Birmingham, AL (US)

( * ) Notice: Subject to any disclaimer, the term of this patent is extended or adjusted under 35 U.S.C. 154(b) by 83 days.

(21) Appl. No.: 18/224,892

(22) Filed: Jul. 21, 2023

Related U.S. Application Data

(63) Continuation-in-part of application No. 17/863,767, filed on Jul. 13, 2022, now Pat. No. 12,039,590, which is a continuation of application No. 16/858,139, filed on Apr. 24, 2020, now Pat. No. 11,423,470.

(51) Int. Cl.
| | |
|---|---|
| *G06Q 30/00* | (2023.01) |
| *G06Q 10/0631* | (2023.01) |
| *G06Q 50/163* | (2024.01) |
| *G07C 9/00* | (2020.01) |
| *H04L 65/1069* | (2022.01) |

(52) U.S. Cl.
CPC ..... G06Q 50/163 (2013.01); G06Q 10/06311 (2013.01); G07C 9/00896 (2013.01); H04L 65/1069 (2013.01)

(58) Field of Classification Search
CPC ........... G06Q 50/163; G06Q 10/06311; G07C 9/00896; H04L 65/1069
See application file for complete search history.

(56) References Cited

U.S. PATENT DOCUMENTS

| | | | |
|---|---|---|---|
| 5,946,660 A | 8/1999 | Mccarty et al. | |
| 6,343,314 B1 | 1/2002 | Ludwig et al. | |
| 6,961,707 B2 * | 11/2005 | Jenkins ................ | G06Q 50/188 705/317 |
| 7,658,327 B2 | 2/2010 | Tuchman et al. | |
| 9,294,719 B2 | 3/2016 | Uhma et al. | |
| 9,516,022 B2 | 12/2016 | Borzycki et al. | |
| 9,679,300 B2 | 6/2017 | Lynch et al. | |
| 9,848,082 B1 | 12/2017 | Lillard et al. | |
| 10,152,719 B2 | 12/2018 | Navaratnam | |
| 10,171,659 B2 | 1/2019 | Riahi et al. | |
| 10,218,848 B2 | 2/2019 | Deryugin et al. | |

(Continued)

OTHER PUBLICATIONS

Public Storage Selects Open Tech Alliances Centralized Intelligent Access (CIA) Solution, ICT Monitor Worldwide [Amman] Jul. 21, 2018, Dialog #2072645748, 2pgs. (Year: 2018).*

(Continued)

*Primary Examiner* — Robert M Pond
(74) *Attorney, Agent, or Firm* — Butler Snow LLP; Jon E. Holland

(57) ABSTRACT

A system for enabling remote management of storage facilities has a videoconferencing system that allows a remote sales agent to communicate with customers at any of a plurality of storage facilities. A presence of the customer is sensed by one or more sensor nodes, and the remote sales agent is alerted to the customer's presence. In response, a videoconference call with the sales agent is established so that the customer sees an image of and may interact with the sales agent through the videoconferencing system.

16 Claims, 17 Drawing Sheets

(56)        References Cited

U.S. PATENT DOCUMENTS

| | | | |
|---|---|---|---|
| 10,269,059 B2 | 4/2019 | Hauk | |
| 11,423,470 B1 | 8/2022 | Boyd et al. | |
| 2007/0007331 A1* | 1/2007 | Jasper | G07G 1/14 |
| | | | 235/379 |
| 2014/0152806 A1 | 6/2014 | Hauk | |
| 2017/0006161 A9 | 1/2017 | Riahi et al. | |
| 2017/0092109 A1* | 3/2017 | Trundle | G05D 1/104 |
| 2017/0293956 A1* | 10/2017 | Fecker | G06Q 30/0613 |
| 2017/0328130 A1* | 11/2017 | Baker | G07C 9/00 |
| 2017/0337591 A1* | 11/2017 | Ali | G06Q 30/0269 |
| 2018/0218374 A1 | 8/2018 | Shah et al. | |
| 2018/0232796 A1 | 8/2018 | Glaser et al. | |
| 2019/0042988 A1 | 2/2019 | Brown et al. | |
| 2019/0342297 A1 | 11/2019 | Adjaoute | |
| 2022/0051515 A1* | 2/2022 | Schmidt | G07C 9/00944 |

OTHER PUBLICATIONS

Boyd, U.S. Appl. No. 17/863,767, entitled, "Systems and Methods for Enabling Remote Management of Storage Facilities", filed Jul. 13, 2022.

\* cited by examiner

SYSTEMS AND METHODS FOR ENABLING REMOTE MANAGEMENT OF STORAGE FACILITIES

CROSS REFERENCE TO RELATED APPLICATION

This application is continuation-in-part of and claims priority to U.S. patent application Ser. No. 17/863,767, entitled "Systems and Methods for Enabling Remote Management of Storage Facilities," which is incorporated herein by reference. U.S. patent application Ser. No. 17/863,767 is continuation of and claims priority to U.S. Pat. No. 11,423,470, entitled "Systems and Methods for Enabling Remote Management of Storage Facilities," which is incorporated herein by reference.

RELATED ART

Storage facilities often have a large number of storage units that can be rented for storage of personal items. A storage facility typically has a main office located close to (e.g., on the same premises as) the storage units. During normal business hours, at least one sales agent is typically available at the main office to interact with customers, including new customers who may enter the main office for more information on renting storage units. Once a customer decides to rent a storage unit, the sales agent assists the customer with completing the necessary paperwork for the rental, and the sales agent provides the customer with a key to be used to unlock the storage unit being rented. The customer may then proceed to the rented storage unit, use the key to open a door to the storage unit, and then use the storage space within the storage unit to store personal items, such as furniture, equipment, or other items that the customer wishes to store. Thereafter, the customer may close and lock the door and at a later time return to the storage unit to retrieve one or more of the stored items as may be desired.

Maintaining on-site sales agents during normal business hours is costly. Thus, to reduce the costs and overhead of managing several storage facilities, it would be generally desirable to use a smaller number of sales agents who interact with customers from a remote location using teleconferencing or videoconferencing equipment. However, many customers are accustomed to interacting with on-site sales agents and may be weary or uncomfortable about interacting with remote sales agents. Also, if a customer is not immediately engaged by a sales agent upon entering the main office, the customer may become frustrated or confused on how to obtain more information about rentals, thereby reducing the likelihood that the customer will attempt to rent a storage unit. In addition, installing and maintaining equipment for enabling communication between customers and remote sales agents can be expensive. For these and other reasons, widespread adoption of systems for enabling remote management of storage facilities has not yet occurred.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 2 provides a more detailed view of an exemplary storage facility that may be managed remotely.

DETAILED DESCRIPTION

The present disclosure generally pertains to systems and methods for enabling remote management of storage facilities. A system in accordance with some embodiments of the present disclosure has a videoconferencing system that allows a remote sales agent to communicate with customers at any of a plurality of storage facilities. When a customer enters a storage facility, such as a main office of the storage facility, the presence of the customer is sensed by one or more sensor nodes, and the remote sales agent is alerted to the customer's presence. In response, a videoconference call with the sales agent is established by the sales agent so that the customer sees an image of the sales agent and may interact with the sales agent through the videoconferencing system. After the call, the customer may further consider any rental offers, inspect the facilities, or take other actions as may be desired by the customer. During this time, the sale agent may tend to other activities, such as communicating with other customers at the same facility or other storage facilities. If the customer desires to speak with the agent again, the customer may provide a user input that automatically establishes a call with the same sales agent, if available.

Accordingly, upon entering a specific area of the facility, the customer may be immediately engaged by a remote sales agent without the customer having to perform any special steps to intentionally initiate the videoconference call. Thus, it is more likely that the customer will utilize the videoconferencing system to obtain more information on rentals, thereby increasing the likelihood that the customer will ultimately decide to rent a storage unit. In addition, by preventing the customer from having to discover how to initiate the call, potential problems and customer frustrations in contacting a sales agent can be reduced. The system can streamline the rental process and provide a rich customer experience so that the customer is more likely to want to engage with the remote sales agent and ultimately rent a storage unit.

Figure 1:
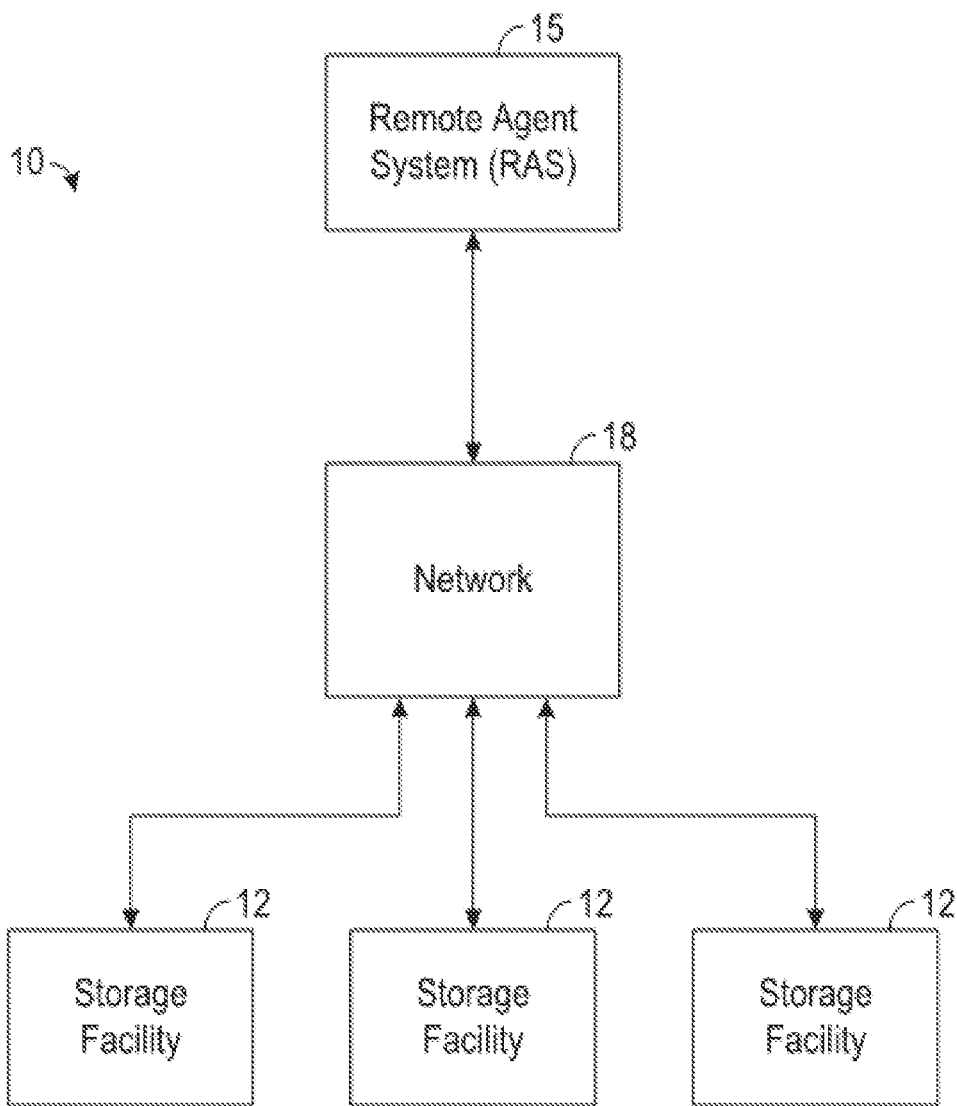
FIG. 1 is a block diagram illustrating an exemplary embodiment of a system for enabling remote management of a plurality of storage facilities.

FIG. 1 depicts an exemplary embodiment of a system 10 for enabling remote management of storage facilities. In the exemplary embodiment shown by FIG. 1, a plurality of storage facilities 12 are in communication with a remote agent system (RAS) 15 through at least one network 18. Each storage facility 12 has a plurality of storage units available for rent, purchase, or use by customers. As will be described in more detail hereafter, each storage facility 12 also has an area, such as a main office, in which customers may enter to discover information on renting, purchasing, or using the storage units and enter into a transaction for renting, purchasing, or otherwise using one or more storage units at the respective facility 12.

In this regard, the owner of the facility 12 may employ one or more sales agents to interact with customers for the purposes of providing information to the customers and assisting the customers in renting or purchasing storage units. However, rather than working on-site at the storage facility 12, a sales agent may work at the remote agent system 15, which is at a remote location relative to the storage facilities 12, and thus service customers at multiple storage facilities 12 such that the overall number of sales agents for servicing customers at all of the storage facilities 12 may be reduced.

The network 18 may comprise any number of conventional communication networks for enabling communication between the storage facilities 12 and the RAS 15. As an example, the network 18 may comprise a wide area network (WAN), such as the Internet, local area network (LAN), cellular network, or any other types of known communication networks.

Figure 2:
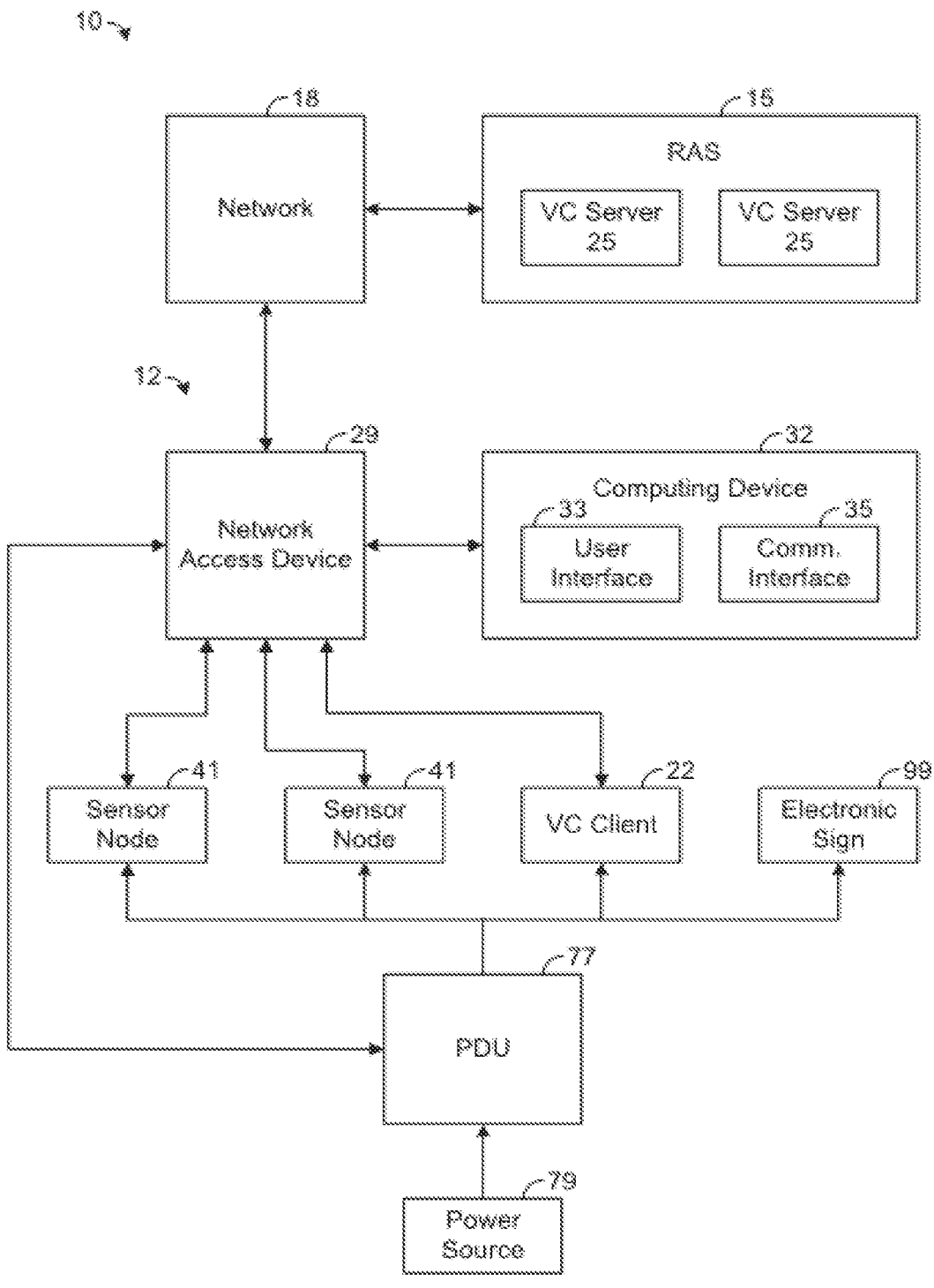
FIG. 2 is a block diagram illustrating an exemplary embodiment of a system, such as is depicted by FIG. 1, for enabling remote management of storage facilities.

FIG. 2 depicts the RAS 15 in communication with one of the storage facilities 12. The depicted storage facility 12 has a videoconferencing (VC) client 22 that may communicate with any a plurality of VC servers 25 at the RAS 15. As will be described in more detail below, a videoconference call may be established between the VC client 22 and a VC server 25 to permit a customer at the storage facility 12 to interact with (e.g., communicate) with a sales agent at the RAS 15.

As shown by FIG. 2, the storage facility 12 has a network access device 29, such as at least one modem, router, switch, or other conventional device for interfacing with the network 18. The network access device 29 may be physically coupled to any device at the storage facility 12 for enabling communication with such device via a physical medium, such as one or more wires or optical fibers. The network access device 29 may also be configured to communicate wirelessly with any device at the storage facility 12. Messages received by the network access device 29 from any device at the storage facility 12 may be encapsulated with overhead according to a protocol of the network 18 (e.g., TCP/IP or other known protocol) for communicating the message through the network to the RAS 15 or other destination.

As shown by FIG. 2, the storage facility 12 has at least one computing device 32 having a user interface 33 for receiving user inputs and providing user outputs. As an example, a customer at the storage facility 12 may use the computing device 32 to view information about the storage units at the facility 12, such as information describing the storage units and contracts pertaining to the storage units (e.g., insurance contracts, rental contracts, purchase contracts, etc.). As an example, a customer may use the computing device 32 to view a contract for renting or insuring a storage unit and provide inputs for executing or accepting the contract. Other types of information, such as advertisements for the storage units, a layout of the storage facility 12, or a location of a specific storage unit being rented, may be displayed or otherwise communicated to the customer by the computing device 32.

In some embodiments, the computing device 32 may be a mobile communications device, such as a smartphone, tablet computer, laptop computer, or other known mobile devices for communicating data and providing user outputs and receiving user inputs. In other embodiments, it is unnecessary for the computing device 32 to be mobile. As an example, the computing device 32 may be implemented with a desktop computer. In one exemplary embodiment, the computing device 32 is implemented with a tablet computer, such as an I-Pad® sold by Apple, Inc., though other types of computing devices 32 may be used in other embodiments.

In some embodiments, the computing device 32 may be a device that remains at the facility 12 and can be used by multiple users as they come and go from the facility 12. Such computing device 32 may be preprogrammed with software (e.g., an application) that is used to communicate and interact with the RAS 12 and/or other components of the system 10. In other embodiments, the computing device 32 may be implemented by a device of the user entering the facility (e.g., a smartphone of the user) that the user may use to communicate and interact with the RAS 15 and/or other components of the system 10. As an example, the user may be a returning customer who has previously downloaded an application for use with the system 10. Alternatively, such as for a new customer, the user may be provided with information, such as at telephone number or a link (e.g., QR code), that may be used to establish communication or to reach a server for downloading an application that is configured to enable the device 32 to communicate and interact with the system 10 as described herein. For example, once a user has decided to rent a unit, the user may activate a link (e.g., scan a QR coded) that then downloads software or information that permits the user to view a rental contract that can then be reviewed and approved by the user.

The user interface 33 may have a display device (not specifically shown), such as a liquid crystal display (LCD), for displaying information to a user and at least one input device, such as a keyboard, keypad, mouse, or other types of known input devices, for receiving user inputs. In some embodiments, the input device may be integrated with the display device. As an example, the user interface 33 may comprise a touchscreen that is configured to display information and to sense touches of the screen by a user (e.g., using one or more fingers, stylus, or other objects).

As shown by FIG. 2, the computing device 32 may have a communication interface 35 that is configured to communicate with the network access device 29 (FIG. 2). As an example, the communication interface 35 may have one or more wireless transceivers for communicating wireless signals (e.g., radio frequency) using known protocols, such as Wi-Fi, Bluetooth, etc. In other embodiments, other types of signals may be used. As an example, the communication interface 35 may be coupled to the network access device 29 by a physical medium, such as one or more wires or optical fibers.

As shown by FIG. 2, the storage facility 12 also has one or more sensor nodes 41 that are used to sense customers at the storage facility 12 and/or provide information that can be used to view or otherwise monitor such customers. To sense a customer, a sensor node 41 may comprise a proximity sensor or a camera, as will be described in more detail below. When a user is sensed by a node 41, the node 41 may be configured to transmit an alert or other message to the RAS 15 so that a sales agent at the RAS 15 may be alerted to the user's presence at the facility 12. In lieu of or in addition to an alert, the sensor node 41 may provide sensed information to the RAS 15, such as a video feed of images captured by the sensor node 41. A sales agent at the RAS 15 may monitor the video feed to observe activity at the facility 12, including when a customer enters an area, such as the facility's main office. Other information may be sensed or otherwise captured by the sensor nodes 41 in other embodiments.

Figure 3:
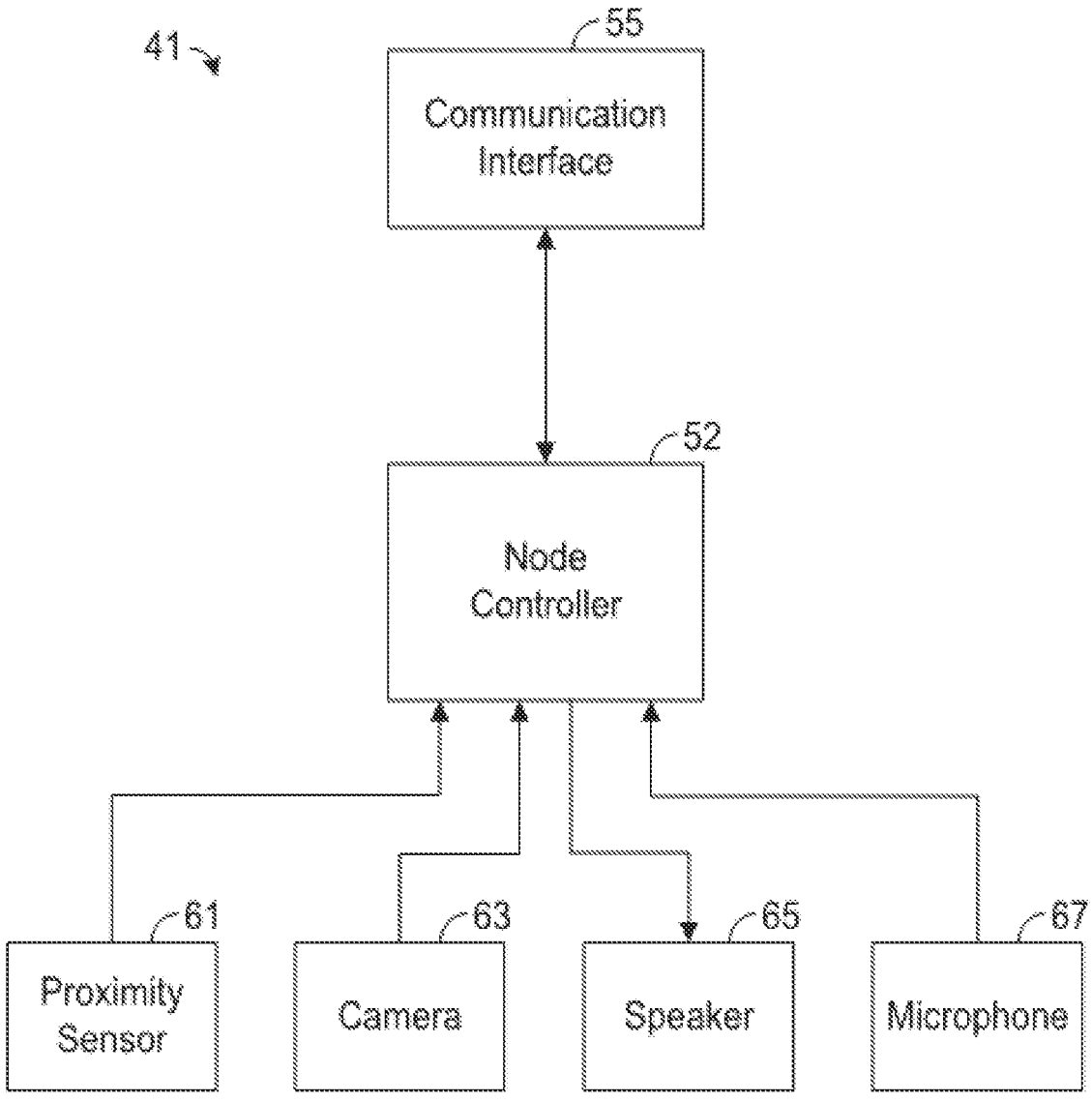
FIG. 3 is a block diagram illustrating an exemplary embodiment of a sensor node, such as is depicted by FIG. 2.

FIG. 3 depicts an exemplary embodiment of a sensor node 41. As shown by FIG. 3, the sensor node 41 comprises a controller 52, referred to herein for illustrative purposes as "node controller," for generally controlling the operation of the node 41. The node controller 52 may be implemented in hardware, software, or any combination thereof. As an example, the node controller 52 may comprise one or more processors (not specifically shown) for executing software instructions to perform the functions described herein for the node controller 52. The node controller 52 may also comprise other types of circuitry for performing the functions described herein.

As shown by FIG. 3, the node controller 52 may be coupled to a communication interface 55 that is configured to communicate with the network access device 29 (FIG. 2) and/or other devices external to the node 41. As an example, the communication interface 55 may have one or more wireless transceivers for communicating wireless signals (e.g., radio frequency) using known protocols, such as Wi-Fi, Bluetooth, etc. In other embodiments, other types of signals may be used. As an example, the communication interface 55 may be coupled to the network access device 29 by a physical medium, such as one or more wires or optical fibers.

In the exemplary embodiment shown by FIG. 3, the sensor node 41 has a proximity sensor 61, a camera 63, a speaker 65, and a microphone 67. The proximity sensor 61 is configured to detect objects within a certain range of the sensor node 41. In some embodiments, the proximity sensor 61 detects objects using infrared radiation. In this regard, the proximity sensor 61 transmits an infrared signal and detects how much infrared radiation from the signal is returned to the sensor 61. Based on the amount or profile of returned infrared radiation, the proximity sensor can detect when an object is moving within a certain range of the sensor 61.

When movement is initially sensed after a predefined amount of time of no sensed movement, the node controller 52 is configured to transmit an alert message through the communication interface 55, network access device 29 (FIG. 2), and network 18 to the RAS 15. In other embodiments, other types of proximity sensors 61 and other techniques for alerting a sales agent at the RAS 15 of a presence of customer or other user at the facility 12 are possible. As an example, as will be described in more detail below, the camera 63 may be used to detect a presence of customer or other user at the facility 12.

The camera 63 is configured to capture images of an area of the facility 12, and the node controller 52 is configured to transmit such images through the communication interface 55, network access device 29 (FIG. 2), and network 18 to the RAS 15 so that a sales agent at the RAS 15 may view the images. As an example, the camera 63 may capture a video feed that is streamed to the RAS 15 for viewing by a sales agent at the RAS 15. Note that the area viewed by the camera 63 may overlap, at least in part, with the area monitored by the proximity sensor 61, although such overlap is unnecessary in other embodiments. As an example, when a sales agent receives an alert for a detection from the proximity sensor 61, the sales agent may view the video images captured by the camera 63 to observe the object sensed by the proximity sensor 61, such as when a new customer enters the area being monitored.

In some embodiments, images from the camera 63 are used to detect the presence of a customer or other users for the purpose of sending an alert to the RAS 15, thereby obviating the need of having a proximity sensor 61 (though use of both a proximity sensor 61 and a camera for detecting users and sending alerts is possible to provide redundancy and, hence, increased robustness). In this regard, the node controller 52 may be configured to compare different frames of the video feed to determine when an object within the field of view of the camera 63 has sufficiently moved to indicate that a presence of a moving user is likely. Techniques for performing image comparisons for the purpose of detecting motion are generally well known and may be used by the node 41 to determine when to send an alert message to the RAS 15.

The speaker 65 is configured to convert audio signals into sound that is output from the speaker 65. As an example, a sales agent at the RAS 15 may send a verbal message that is output by the speaker 65 to a customer or other use in the vicinity of the sensor node 41. The microphone 67 is configured to convert sound into audio signals. As an example, a verbal message by a customer or other user in the vicinity of the sensor node 41 may be captured by the microphone 67 and transmitted to the RAS 15 so that the verbal message may be heard by a sales agent at the RAS 15. Thus, via the speaker 65 and microphone 67, a sales agent at the RAS 15 may converse with a customer near the node 41.

Referring again to FIG. 2, the storage facility 12 may have a power distribution unit (PDU) 77 that is coupled to a power source 79, which is configured to provide at least one power signal to the PDU 77. As an example, the power source 79 may be an electrical outlet (e.g., wall outlet) for providing electrical power from a power network or gird, though other types of power sources, such as batteries or generators, may be used. As shown by FIG. 2, the PDU 77 may also be coupled to one or more devices at the facility 12 for delivering electrical power to such devices based on the power signal from the power source 77.

Figure 4:
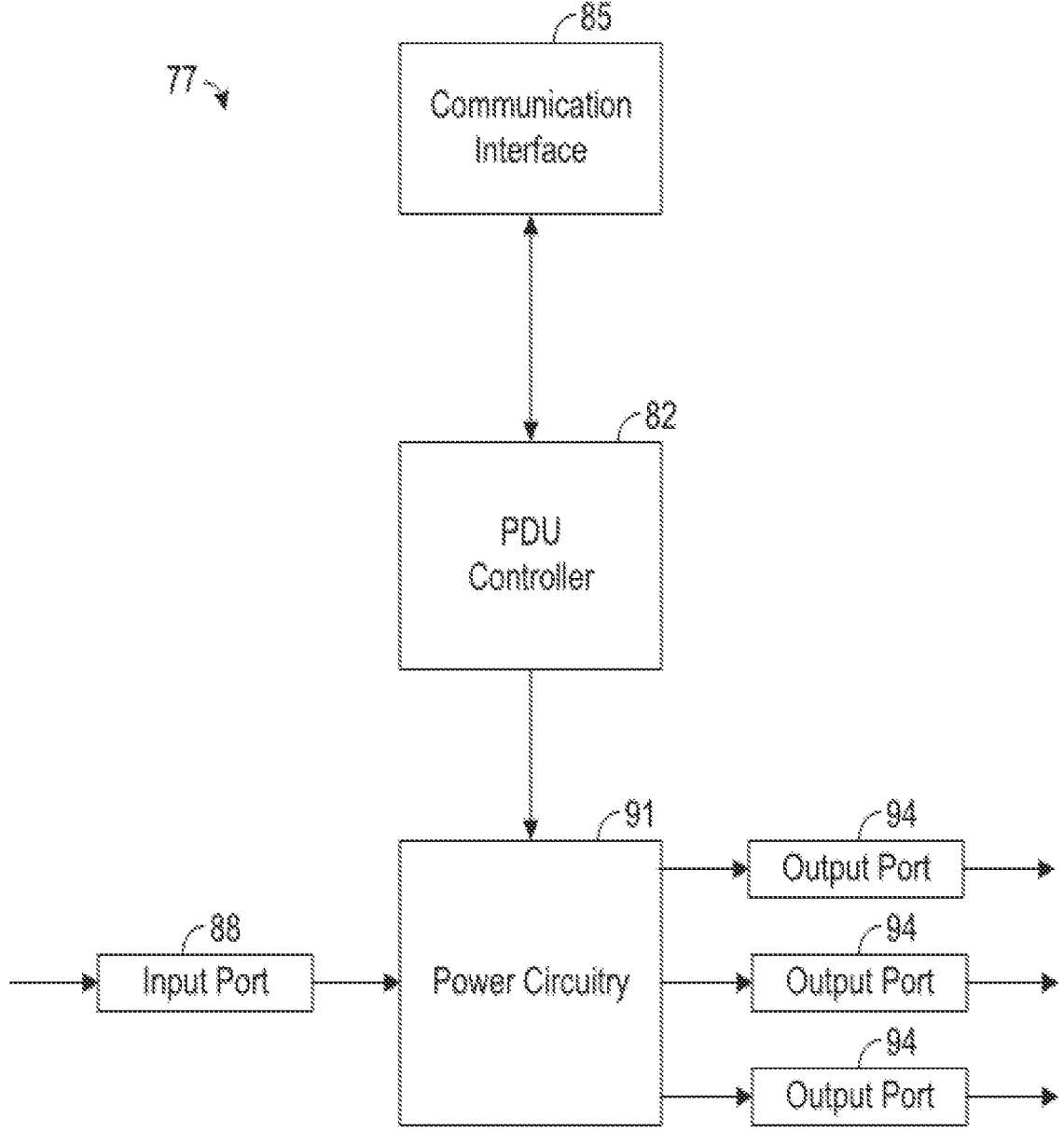
FIG. 4 is a block diagram illustrating an exemplary embodiment of a power distribution unit (PDU), such as is depicted by FIG. 2.

FIG. 4 depicts an exemplary embodiment of the PDU 77. As shown by FIG. 4, the PDU 77 comprises a controller 82, referred to herein for illustrative purposes as "PDU controller," for generally controlling the operation of the PDU 77. The PDU controller 82 may be implemented in hardware, software, or any combination thereof. As an example, the PDU controller 82 may comprise one or more processors (not specifically shown) for executing software instructions to perform the functions described herein for the PDU controller 82. The PDU controller 82 may also comprise other types of circuitry for performing the functions described herein.

As shown by FIG. 4, the PDU controller 82 may be coupled to a communication interface 85 that is configured to communicate with the network access device 29 (FIG. 2) and/or other devices external to the PDU 77. As an example, the communication interface 85 may have one or more wireless transceivers for communicating wireless signals (e.g., radio frequency) using known protocols, such as Wi-Fi, Bluetooth, etc. In other embodiments, other types of signals may be used. As an example, the communication interface 85 may be coupled to the network access device 29 by a physical medium, such as one or more wires or optical fibers.

The PDU 77 has an input port 88 that is coupled to the power source 79 (FIG. 1) for receiving an analog power signal from the power source 79. Such power signal is processed by power circuitry 91 that divides or otherwise processes power from the received power signal to deliver a plurality of power signals via output ports 94. Each output port 94 may be coupled to a respective device at the facility 12 to provide an analog power signal to the device for powering components of the device as may be desired. As an example, each of the VC client 22, sensor nodes 41, and at least one electronic sign 99 may be coupled to a respective output port 94 and receive electrical power from such port 94. In other embodiments, other devices at the facility 12, such as the computing device 32, for example, may be coupled to and receive power from the PDU 77.

Note that the power circuitry 91 may condition or process the power signal from the input port 88 in various ways. As an example, the power circuitry 91 may control (e.g., regulate) the voltage and current of the power signals output by the ports 94, and the power circuitry 91 may operate under the control of the PDU controller 82 to selectively cutoff power to any output port 94 as may be desired. Such a feature may be beneficial for the purpose of forcing a reboot of a device having an operational problem. As an example, if a sales agent at the RAS 15 suspects that a device (e.g., VC client 22, a sensor node 41, or other device) coupled to the PDU 77 is experiencing an operational problem, the sales agent may send to the PDU 77 through the network 18 a command instructing the PDU 77 to cycle the port 94 to which the device having the operational problem is coupled. In response, the PDU controller 82 may control the power circuitry 91 such that power to the identified port 94 is temporarily cutoff. Thus, the port 94 temporarily stops transmitting a power signal to the device having the operational problem. When the power signal is again provided to the device, such device may be configured to initiate a power up process including a booting routine. Rebooting of the device in this manner may correct the operational problem so that the device begins to operate normally again, thereby correcting or otherwise addressing the operational problem. Note that power cycling a port 94 in this manner may be performed for other reasons. As an example, power to a port 94 may be controlled to turn off the device coupled to the port 94, such as when the main office is closed to customers.

As an example, the electronic sign 99 may be configured to display a message indicating whether the main office at the storage facility 12 is open so that customers may enter the facility 12. As an example, the electronic sign 99, when operating, may light up or otherwise display the word "Open" to indicate that the main office is currently open for business with customers or the word "Closed" to indicate that the main office is currently closed for business with customers. Other messages may be displayed or otherwise communicated (e.g., audio messages) in other embodiments.

For illustrative purposes, assume that the electronic sign 99 displays the word "Open." When a sales agent is available at the RAS 15 for assisting and interacting with customers at the facility 12 (e.g., during normal working hours), the sales agent may use a VC server 25 or other device at the RAS 15 to transmit a command through the network 18 to the PDU 77 for instructing the PDU 77 to provide power to the output port 94 coupled to the sign 99. In response, the PDU controller 82 controls the power circuitry 91 such that a power signal is transmitted through the port 94 to the sign 99, which uses power from such signal to electronically display the message "Open."

However, when a sales agent is no longer available to assist and interact with customers at the facility 12 (such as at the end of normal business hours or during a lunch break), the sales agent may transmit a command through the network 18 to the PDU 77 for instructing the PDU 77 to stop providing power to the output port 94 coupled to the sign 99. In response, the PDU controller 82 controls the power circuitry 91 such that the power signal is no longer transmitted through the port 94 to the sign 99. Since the sign 99 is no longer receiving power from the PDU 77, it stops displaying the "Open" message. Thus, whether the sign 99 displays the "Open" message is effectively controlled by whether the PDU 77 provides power to the sign 99.

Note that, in other embodiments, the RAS controller 163 (FIG. 6) or other device at the RAS 15 may be configured to automatically send commands to the PDU 77 for controlling the electronic sign 99. As an example, the PDU 77 may be controlled to automatically turn the sign on and off at certain times of the day (e.g., keep the sign on during normal business hours and off outside of normal business hours).

Note that there are other techniques that may be used to control signage at the facility 12. As an example, a "smart" sign having a controller that is configured to communicate with the RAS 15 through the network access device 29 and network 18 may be used. In such a case, a sales agent at the RAS 15 may remotely control whether the sign displays a message and may also control the content of the message. As an example, the sales agent may enter or otherwise provide the content to be displayed. However, such a "smart" sign may be more expensive than a sign that displays the same message depending on whether it is receiving electrical power. Moreover, the use of a PDU 77 to control whether an electronic sign 99 displays content based on whether the PDU 77 is transmitting an electrical power signal to the sign 99 provides a convenient and inexpensive way for a sales agent to control the sign 99 from the RAS 15.

Figure 5:
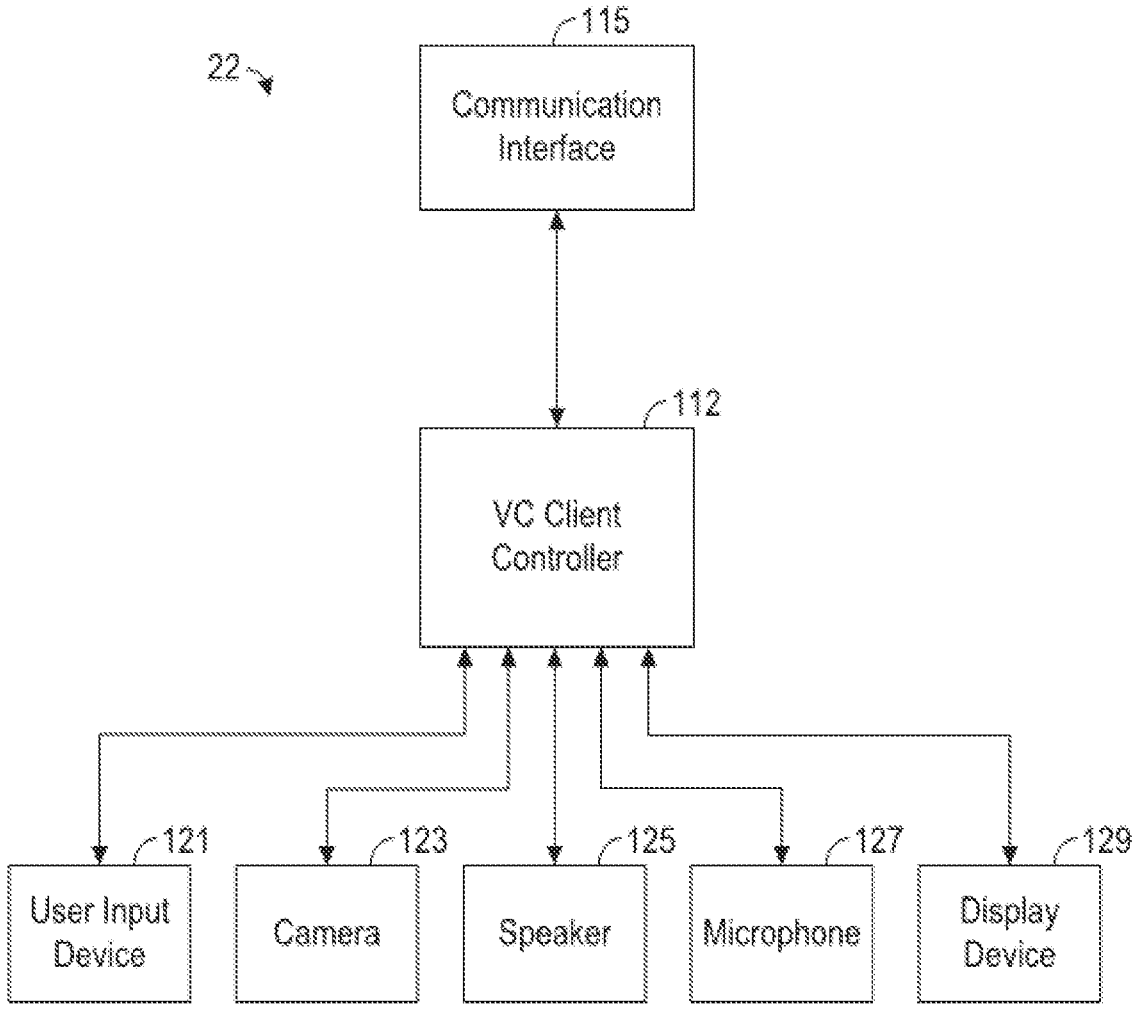
FIG. 5 is a block diagram illustrating an exemplary embodiment of a videoconferencing (VC) client, such as is depicted by FIG. 2.

FIG. 5 depicts an exemplary embodiment of the VC client 22. As noted above, a videoconference call may be established between the VC client 22 at a storage facility 12 and a VC server 25 at the RAS 15 to provide a video conferencing session between a customer or other user at the storage facility 12 and a sales agent or other user at the RAS 15. As shown by FIG. 5, the VC client 22 comprises a controller 112, referred to herein for illustrative purposes as "VC client controller," for generally controlling the operation of the VC client 22. The VC client controller 112 may be implemented in hardware, software, or any combination thereof. As an example, the VC client controller 112 may comprise one or more processors (not specifically shown) for executing software instructions to perform the functions described herein for the VC client controller 112. For example, the VC client controller 112 may be implemented with a computing device, such as smartphone, a tablet computer, a laptop computer, or a desktop computer. The VC client controller 112 may also comprise other types of circuitry for performing the functions described herein.

As shown by FIG. 5, the VC client controller 112 may be coupled to a communication interface 115 that is configured to communicate with the network access device 29 (FIG. 2) and/or other devices external to the VC client 22. As an example, the communication interface 115 may have one or more wireless transceivers for communicating wireless signals (e.g., radio frequency) using known protocols, such as Wi-Fi, Bluetooth, etc. In other embodiments, other types of signals may be used. As an example, the communication interface 115 may be coupled to the network access device 29 by a physical medium, such as one or more wires or optical fibers.

In the exemplary embodiment shown by FIG. 5, the VC client 22 has a user input device 121, a camera 123, a speaker 125, a microphone 127, and a display device 129. The camera 123 is configured to capture images of an area of the facility 12, such as the customer or other user involved in a video conferencing session. For example, the camera 123 may be positioned so that a customer standing or otherwise positioned in front of the display device 129 is within the field of view of the camera 123.

The VC client controller 112 may be configured to transmit the images captured by the camera 123 through the communication interface 115, network access device 29 (FIG. 2), and network 18 to the RAS 15 so that a sales agent at the RAS 15 may view the images. As an example, when a customer is standing or otherwise positioned (e.g., sitting) in front of the display device 129 to view the images displayed by the device 129, the camera 123 may capture a video feed depicting the customer, and this video feed may be streamed to the RAS 15 for viewing by a sales agent at the RAS 15. Note that, as described in more detail below, the VC client 22 may be positioned in the main office so that a customer may be viewed by the camera 123 near the entrance of the main office before the customer has approached the display device 129 for the videoconferencing session or even before the customer realizes that a videoconferencing session has been initiated.

Note that the camera 123 may be used to detect a presence of a customer or other user within the field of view of the camera 123 for the purpose of sending an alert message to the RAS 15, as described above for sensor nodes 41. In this regard, the VC client controller 112 may be configured to receive frames of a video feed from the camera 123 and to compare frames of the video feed to detect when there is sufficient motion to indicate a likely presence of a customer or other user. In response to such detection, the VC client controller 112 may attempt to initiate a videoconferencing call with a VC server 25 according to techniques described herein. In other embodiments, the VC client controller 112 may transmit an alert message to the VC server 25 or one of the computing devices 190 at the workstation 156 associated with the facility 12, as will be described in more detail below, so that a sales agent at such workstation 156 may be alerted to the presence of the customer or other user.

As used herein, an "alert message" refers to a message that is transmitted in response to a detection of a user (e.g., detected motion) that triggers a specialized alert (e.g., audible or visual) at the RAS 15 for alerting a sales agent or other user at the RAS 15 to the user detection that triggered the alert message. As an example, the alert may be a series of audible beeps, an audible or visual messages, flashes on a display, or other changes to a display. In response to such alert, the sales agent may decide one or more actions, such as whether and when to initiate a videoconferencing call to interact with the customer or other user. In such an embodiment, use of the sensor nodes 41 is unnecessary to alert the sales agent of a customer's presence. However, is possible for alerts to be sent by the VC client 22 as well as one or more sensor nodes 41 to provide redundancy and thus enhanced resiliency and robustness.

System resiliency and robustness is particularly enhanced when the VC client 22 utilizes a different communication platform than the sensor nodes 41. As an example and as described further below, a sensor node 41 may be paired with a computing device 190 (FIG. 6) using IP addressing and/or other types of information so that the sensor node 41 can communicate with the paired computing device 190 as long as the sensor node 41 can reach the Internet. Further, the communication interface 55 (FIG. 3) of the sensor node 41 may have a cellular transceiver that enables the sensor node 41 to access the Internet through a cellular network even if sensor node 41 is unable to communicate with the network access device 29 for any reason. Thus, even if the VC client 22 is unable to communicate with the RAS 15, if the user detection functionality of the VC client 22 is not working properly, or if there is some other operational problem limiting the functionality of the VC client 22, a sales agent at the RAS 15 may nevertheless be alerted to a new customer entering the facility 12 by a sensor node 41. The sales agent may also communicate with the customer through the sensor node 41, even if this form of the communication is not as rich as that provided by the VC client 22 (e.g., the customer is unable to see an image of the sales agent or the quality of the sound emitted by the sensor node 41 is not as high as the VC client 22). Such an architecture enables expensive audio/video equipment to be used for the VC client 22 for normal operation and less expensive sensor nodes 41 to provide added or redundant functionality, such as to provide a lifeline to a customer in the event of a system failure with the VC client 22 or other components, such as the network access device 29.

The speaker 125 of FIG. 5 is configured to convert audio signals into sound that is output from the speaker 125. As an example, during the video conferencing session, a sales agent or other user at the RAS 15 may send a verbal message that is output by the speaker 125 to the customer or other user at the facility 12 in the video conferencing session. The microphone 127 is configured to convert sound into audio signals. As an example, a verbal message by the customer or other user in the video conferencing session at the facility 12 may be captured by the microphone 127 and transmitted to the RAS 15 so that the verbal message may be heard by a sales agent at the RAS 15. In addition, the display device 129 may be used to render a video stream captured by a camera (not shown in FIG. 5) at the RAS 15. As an example, an image of the sales agent in the video conferencing session may be displayed by the display device 129. Thus, via the speaker 125, microphone 127, and display device 129, a sales agent at the RAS 15 may converse with the customer or other user at the facility 12 in the video conferencing session where the customer is able to see the sales agent with whom he or she is speaking.

The user input device 121 is configured to receive user inputs from a user of the VC client 22. As an example, the user input device 121 may be a keyboard, keypad, mouse, or other device conventionally used to receive user inputs. In some embodiments, the user input device 121 may be utilized to establish a videoconferencing call with a VC server 25. As an example, the user input device 121 may comprise a button or other type of switch that when activated by a user provides an input that causes the VC client controller 112 to establish a videoconferencing call with a VC server 25, as will be described in more detail below. In some embodiments, the VC client controller 112 may store sufficient information, such as Internet protocol (IP) addresses, call numbers, or other information that may be used to establish a videoconference call, and this information may be used by the VC client controller 112 to initiate such a call. In other embodiments, other techniques for establishing videoconferencing calls may be used.

Figure 6:
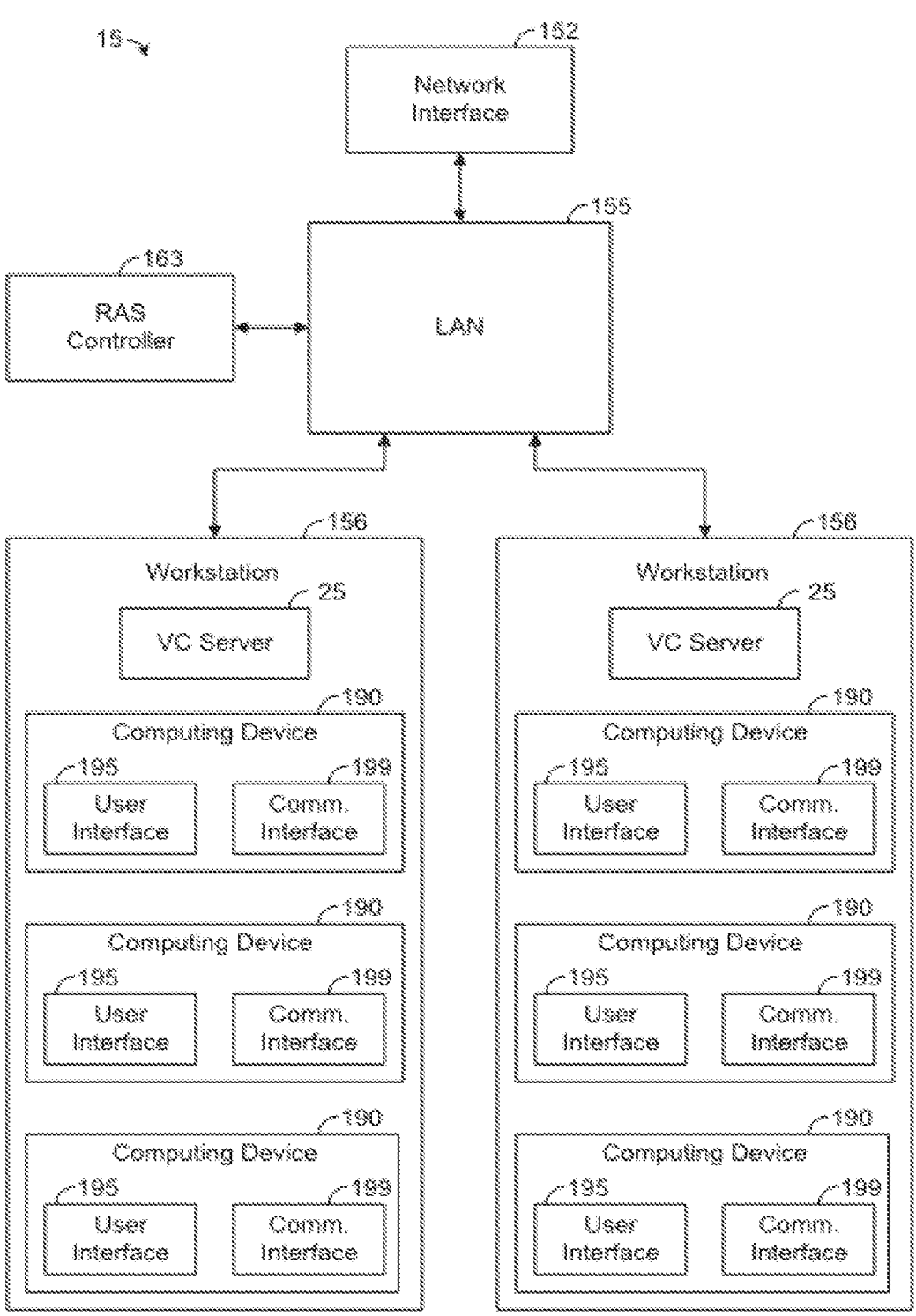
FIG. 6 is a block diagram illustrating an exemplary embodiment of a remote agent system (RAS), such as is depicted by FIG. 2.

FIG. 6 depicts an exemplary embodiment of the RAS 15. The RAS 15 depicted by FIG. 6 has a network interface 152, such as one or more modems, routers, or switches, configured to communicate with the network 18 (FIG. 2). The exemplary RAS 15 also has a LAN 155 that can be used for communication among devices at the RAS 15. As shown by FIG. 6, the RAS 15 has a plurality of workstations 156 that sales agents may use to remotely manage storage facilities 12, as described herein. As will be described in more detail below, each workstation 156 has at least one VC server 25 and a plurality of computing devices 190. Each VC server 25 may be used to establish videoconferencing sessions with the VC clients 22 (FIG. 2) at various storage facilities 12. In this regard, a videoconferencing session may be established between any VC server 25 and any VC client 22. The RAS 15 also has a RAS controller 163, which will be described in more detail below.

Figure 7:
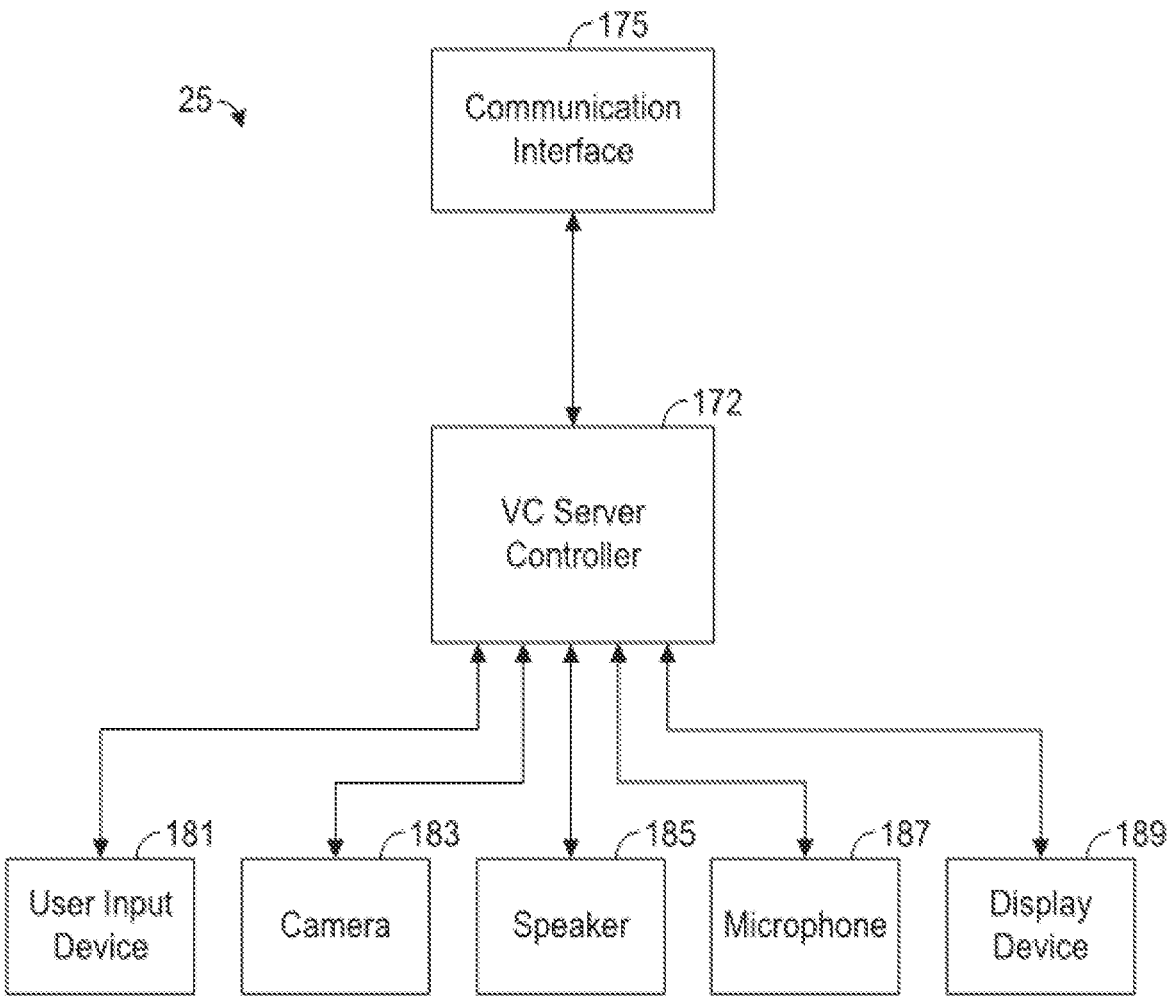
FIG. 7 is a block diagram illustrating an exemplary embodiment of a VC server, such as is depicted by FIG. 2.

FIG. 7 depicts an exemplary embodiment of a VC server 25. As noted above, a videoconference call may be established between the VC server 25 and a VC client 22 to provide a video conferencing session between a customer or other user at the VC client 22 and a sales agent or other user at the VC server 25. As shown by FIG. 7, the VC server 25 comprises a controller 172, referred to herein for illustrative purposes as "VC server controller," for generally controlling the operation of the VC server 25. The VC server controller 172 may be implemented in hardware, software, or any combination thereof. As an example, the VC server controller 172 may comprise one or more processors (not specifically shown) for executing software instructions to perform the functions described herein for the VC server controller 172. For example, the VC server controller 172 may be implemented with a computing device, such as smartphone, a tablet computer, a laptop computer, or a desktop computer. The VC server controller 172 may also comprise other types of circuitry for performing the functions described herein.

As shown by FIG. 7, the VC server controller 172 may be coupled to a communication interface 175 that is configured to communicate with the LAN 155 (FIG. 6), such as transmitting messages through the LAN 155, network interface 152 and network 18 (FIG. 2) to a storage facility 12 or receiving messages from a storage facility 12. As an example, the communication interface 175 may have one or more wireless transceivers for communicating wireless signals (e.g., radio frequency) using known protocols, such as Wi-Fi, Bluetooth, etc. In other embodiments, other types of signals may be used. As an example, the communication interface 175 may be coupled to the LAN 155 or other system component by a physical medium, such as one or more wires or optical fibers.

In the exemplary embodiment shown by FIG. 7, the VC server 25 has a user input device 181, a camera 183, a speaker 185, a microphone 187, and a display device 189. The camera 183 is configured to capture images of an area of the RAS 15, such as the sales agent or other user involved in a video conferencing session. For example, the camera 183 may be positioned so that a sales agent standing or otherwise positioned in front of the display device 189 is within the field of view of the camera 183. The VC server controller 172 may be configured to transmit the images captured by the camera 183 through the communication interface 175, LAN 155 (FIG. 6), network interface 152, and network 18 (FIG. 2) to a VC client 22 at a storage facility 12 so that a customer or other user at the facility 12 may view the images. As an example, when a sales agent is standing or otherwise positioned in front of the display device 189 to view the images displayed by the device 189, the camera 183 may capture a video feed depicting the sales agent, and this video feed may be streamed to the VC client 22 at the storage facility 12 for viewing by a customer or other user at the facility 12.

The speaker 185 is configured to convert audio signals into sound that is output from the speaker 185. As an example, during the video conferencing session, a customer or other user at the VC client 22 may send a verbal message that is output by the speaker 185 to the sales agent or other user at the RAS 15 in the video conferencing session. The microphone 187 is configured to convert sound into audio signals. As an example, a verbal message by the sales agent or other user in the video conferencing session at the VC server 25 may be captured by the microphone 187 and transmitted to the VC client 22 at the storage facility 12 so that the verbal message may be heard by a customer or other user at the facility 12. In addition, the display device 189 may be used to render a video stream captured by the camera 123 (FIG. 5) at the VC client 22. As an example, an image of the customer or other user at the storage facility 12 in the video conferencing session may be displayed by the display device 189. Thus, via the speaker 185, microphone 187, and display device 189, a sales agent at the RAS 15 may converse with the customer or other user at the facility 12 in the video conferencing session where the sales agent is able to see the customer with whom he or she is speaking.

The user input device 181 is configured to receive user inputs from the user of the VC server 25. As an example, the user input device 181 may be a keyboard, keypad, mouse, or other device conventionally used to receive user inputs. In some embodiments, the user input device 181 may be utilized to establish a videoconferencing call with a VC client 22. As an example, upon recognizing that a new customer has entered a particular facility 12 or that a customer at the facility needs assistance, a sales agent may use the device 181 to provide inputs for selecting or otherwise identifying the VC client 22 to be called. In some embodiments, the VC server controller 172 may store sufficient information, such as Internet protocol (IP) addresses, call numbers, or other information that may be used to establish a videoconference call, and this information may be used by the VC server controller 172 to initiate such a call. In other embodiments, other techniques for establishing videoconferencing calls may be used.

As shown by FIG. 6, the RAS 15 has a plurality of computing devices 190. Each computing device 190 has a user interface 195 for receiving user inputs and providing user outputs. In some embodiments, each of the computing devices 190 may be a mobile communications device, such as a smartphone, tablet computer, laptop computer, or other known mobile devices for providing user outputs and receiving user inputs. In other embodiments, it is unnecessary for the computing devices 190 to be mobile. As an example, a computing device 190 may be implemented with a desktop computer. In one exemplary embodiment, each computing device 190 is implemented with a tablet computer, such as an I-Pad® sold by Apple, Inc., though other types of computing devices 190 may be used in other embodiments.

The user interface 195 may have a display device (not specifically shown), such as a liquid crystal display (LCD), for displaying information to a user and at least one input device, such as a keyboard, keypad, mouse, or other types of known input devices, for receiving user inputs. In some embodiments, the input device may be integrated with the display device. As an example, the user interface 195 may comprise a touchscreen that is configured to display information and to sense touches of the screen by a user (e.g., using one or more fingers, stylus, or other objects).

As shown by FIG. 6, each computing device 32 may have a communication interface 199 that is configured to communicate with the LAN 155, such as transmitting messages through the LAN 155, network interface 152 and network 18 (FIG. 2) to a storage facility 12 or receiving messages from a storage facility 12. As an example, the communication interface 199 may have one or more wireless transceivers for communicating wireless signals (e.g., radio frequency) using known protocols, such as Wi-Fi, Bluetooth, etc. In other embodiments, other types of signals may be used. As an example, the communication interface 199 may be coupled to the LAN 155 or other system component by a physical medium, such as one or more wires or optical fibers.

In some embodiments, each sale agent at the RAS 15 is associated with a respective VC server 25 and a plurality of computing devices 190. As an example, a sales agent may be positioned at a respective workstation 156 where he or she has access to and can view the output from the agent's associated VC server 25 and computing devices 190. As will be described in more detail below, the agent's VC server 25 may be used to interact with a customer at any facility 12 in a videoconference call. Further, the agent's associated computing devices 190 may be used to obtain information from a plurality of storage facilities 12 for which the agent is responsible for monitoring. In some embodiments, the display devices of the VC server 25 and all of the computing devices 190 of the same workstation 156 are simultaneously viewable from the same location. Thus, a sales agent for the workstation 156 at such location may selectively view any such display device without having to move to a new location, thereby assisting the sales agent in monitoring of activities at the associated storage facilities 12 for the workstation 156.

In this regard, for some embodiments, a given sales agent may be assigned a plurality of storage facilities 12 for which the agent is responsible for monitoring. By monitoring the same facilities 12 over time, the agent can become familiar with the storage facilities 12 assigned to him or her and thus be able to assist customers at those facilities better, such as better answering their questions about these facilities 12 or directing customers to resources available at such facilities 12.

Each computing device 190 is configured to communicate with one or more sensor nodes 41 (FIG. 2) at a respective facility 12. In this regard, in some embodiments, each computing device 190 is associated with a specific storage facility 12 and is configured to display or otherwise output information (e.g., camera feeds) from the sensor nodes 41 at that facility 12. As an example, the sensor nodes 41 at a given facility 12 may be provisioned with one or more addresses of the computing device 190 associated with such facility 12 so that they communicate with and are controlled by the associated computing device 190. That is, a sensor node 41 at a facility associated with a particular computing device 190 may be paired with that computing device 190 such that information from such node 41 is transmitted to the computing device 190.

Note that there are various techniques that can be used to pair a sensor node 41 with a computing device 190 at the RAS 15. In one embodiment, the pairing is performed such that the computing device 190 and the sensor node 41 can communicate over the Internet. In this regard, during a pairing process prior to normal operation, the computing device 190 may be moved to a close proximity of the sensor node 41 so that the computing device 190 and sensor node 41 may communicate using a short-range wireless protocol, such as Bluetooth, for example. After establishing communication, the computing device 190 and sensor node 41 may exchange IP addresses and/or other information that enables communication over the Internet and/or other networks. After pairing, the computing device 190 may be moved to the RAS 15, and the computing device 190 and the sensor node 41 may communicate using the information exchanged during the pairing process. In other embodiments, other techniques for pairing the sensor node 41 with a computing device 190 are possible.

Thus, the computing device 190 associated with a given facility 12 may display a video stream captured by the camera 63 (FIG. 3) of a sensor node 41 at such facility 12. At any given time, a sales agent may view the user interface 195 of such computing device 190 at the RAS 15 to see the scene at the associated storage facility 12 captured by a sensor node 41. Moreover, over time, the sales agent may view or otherwise monitor the computing devices 190 at his or her workstation 156 to check the status of any of the storage facilities 12 for which he or she is responsible for monitoring.

As an example, to determine whether a customer is in the main office of a certain storage facility 12, the sales agent may find the computing device 190 that is associated with that facility 12 and simply view the user interface 195 of this computing device 190. The sales agent may continue to view the customer with such computing device 190 to observe the behavior of the customer. If the sales agent, based on such observations, determines that the customer appears to need assistance, the sales agent may initiate a videoconferencing call with the VC client 22 (FIG. 2) at the same facility 12 using the VC server 25 at his or her workstation 156 in an effort to communicate with and assist the customer.

Note that multiple agents may be assigned the responsibility of monitoring the same or different storage facilities 12. Moreover, monitoring responsibilities may be distributed in any manner as may be desired.

Figure 8:
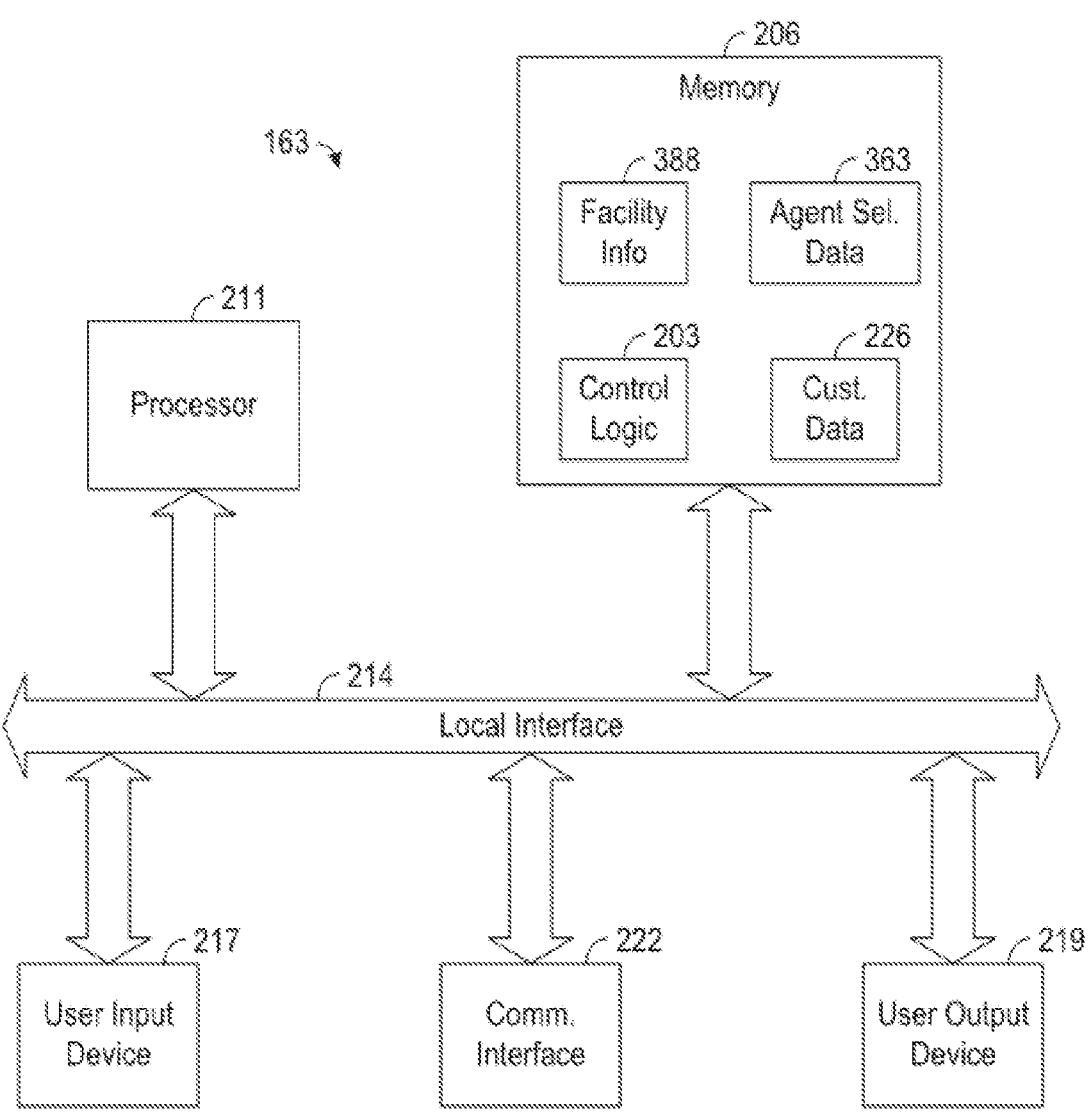
FIG. 8 is a block diagram illustrating an exemplary embodiment of a RAS controller, such as is depicted by FIG. 6.

FIG. 8 depicts an exemplary embodiment of the RAS controller 163. As shown by FIG. 8, the RAS controller 163 comprises control logic 203 for generally controlling the operation of the RAS controller 163, as will be described in more detail hereafter. The control logic 203 can be implemented in software, hardware, or any combination thereof. In the exemplary RAS controller 163 illustrated by FIG. 8, the control logic 203 is implemented in software and stored in memory 206 of the RAS controller 163.

The exemplary RAS controller 163 depicted by FIG. 8 comprises at least one conventional processor 211, such as a digital signal processor (DSP) or a central processing unit (CPU), that communicates to and drives the other elements within the RAS controller 163 via a local interface 214, which can include at least one bus. Furthermore, a user input device 217, for example, a keyboard, keypad, mouse, or other types of known input devices can be used to input data from a user of the RAS controller 163, and a user output device 219, for example, a printer, monitor, liquid crystal display (LCD), or other display apparatus, can be used to output data to the user.

Further, a communication interface 222 is configured to communicate with the LAN 155, such as transmitting messages through the LAN 155 (FIG. 6), network interface 152 and network 18 (FIG. 2) to a storage facility 12 or receiving messages from a storage facility 12. As an example, the communication interface 222 may have one or more wireless transceivers for communicating wireless signals (e.g., radio frequency) using known protocols, such as Wi-Fi, Bluetooth, etc. In other embodiments, other types of signals may be used. As an example, the communication interface 222 may be coupled to the LAN 155 or other system component by a physical medium, such as one or more wires or optical fibers.

As shown by FIG. 8, customer data 226 may be stored in the memory 226. The customer data 226 may be associated with customers any of the storage facilities 12. As an example, when a customer applies to rent a storage unit, information from an application filled out by the user may be stored as part of the customer data 226. Such information may include information about the customer, such as his or her name, address, contact information (e.g., telephone number or email address). The customer data 226 may also indicate which storage units have been rented by the customer. In addition, the customer data 226 may indicate whether the customer has purchased insurance for any such storage units or may indicate any other information associated with the customer as may be desired.

Note that a user (e.g., a sales agent) of any VC server 25 may access and update the customer data 226 as may be desired. In this regard, the user may provide inputs via the user input device 217 to update the customer data 226 and view the customer data 226 via the user output device 219. It is also possible for a user to use any VC server 25 or other device in communication with the RAS controller 163 to access and update the customer data 226.

In addition, as noted above, any of the sensor nodes 41 (FIG. 2) may be configured to send an alert message when a customer is sensed by the node 41, such as when a customer enters the main office being monitored by the sensor node 41. As an example, a sensor node 41 may be configured to sense a presence of a new customer when it detects movement of an object (e.g., senses motion with its proximity sensor 61) after at least a predefined amount of time of sensing no motion. In response to such detection, the sensor node 41 may be configured to transmit an alert to the computing device 190 that is associated with the facility 12 in which the sensor node 41 is located.

In response to the alert message, the computing device 190 may be configured to generate an alert to the sales agent, such as outputting an audible message or cue (e.g., a series of beeps or a pre-recorded or computer-generated verbal message) or a visual message or cue. Upon hearing or otherwise receiving the alert, the sales agent may view the video feed displayed by the computing device 190 to see a video image captured by the sensor node 41.

Thus, upon receiving an alert that a new customer has been detected, the sales agent may view the user interface 195 of the computing device 190 that provided the alert to visually confirm whether a new customer has indeed entered the main office of the storage facility 12. If so, the sales agent may then use the VC sever 25 at his or her workstation 156 to initiate a videoconferencing call with the VC client 22 at the same facility. Thus, the sales agent may communicate with the new customer through the videoconferencing call to assist the new customer.

From the customer's perspective, upon entering the main office, a video stream of the sales agent is displayed to the customer by the VC client 22, and the customer may converse with the sales agent just as if the sales agent was actually at the storage facility 12. This functionality and customer experience occur without the customer having to take any specialized action other than simply entering the main office of the storage facility 12. In addition, the video call can be initiated and the image of the sales agent can be displayed to the customer shortly after the customer enters the main office. Accordingly, the customer is less likely to be confused or frustrated before having the opportunity to converse with the sales agent, thereby increasing the likelihood that the customer will utilize the video conferencing capabilities of the system 10 to receive assistance and feedback from the sales agent.

Note that similar techniques may be used to alert a sales agent when a customer approaches the VC client 22. In such example, a sensor node 41 may determine when the customer has entered into an area monitored by the sensor node 41 close to the VC client 22 and, in response, transmit an alert message to the computing device 190 associated with the facility 12 to cause such device 190 to emit an alarm. The sales agent (having been alerted to the presence of the customer near the VC client 22) may decide to initiate a videoconference call with the VC client 22 so that the customer does not need to provide an input for initiating a call. In other examples, the sales agent may establish a videoconference call with a customer for other reasons. In addition, as noted above, it is possible for other system components, such as the VC client 22 to detect a presence of the customer and send an alert message to the RAS 15.

In some embodiments, the VC client 22 at a given storage facility 12 is provisioned with one or more addresses of the VC server 25 of the sales agent who is responsible for monitoring that particular storage facility. Thus, if a videoconferencing call is initiated by the VC client 22, the call is established with the VC server 25 of the agent who is responsible for the facility 12 in which the VC client 22 resides, assuming such sales agent is available. Thus, the call should go to a sales agent who is familiar with the storage facility 12 and thus can better answer the customer's questions or provide better feedback.

In addition, from a customer service perspective, it is generally desirable for the same customer to be assisted by the same sales agent over multiple calls. In this manner, the sales agent may already be familiar with the customer and the issues that the customer may be having and, therefore, be able to provide better and more efficient feedback to the customer relative to other sales agents. Provisioning the VC client 22 to initiate calls to the VC server 25 of the sales agent associated with the storage facility 12 helps to ensure that the customer will be connected to the same agent each time he or she uses the VC client 22 to initiate a videoconference call, assuming such sales agent is available. A described in more detail above, it is possible however for calls to go to different sales agents based on agent availability or other factors.

Figure 9:
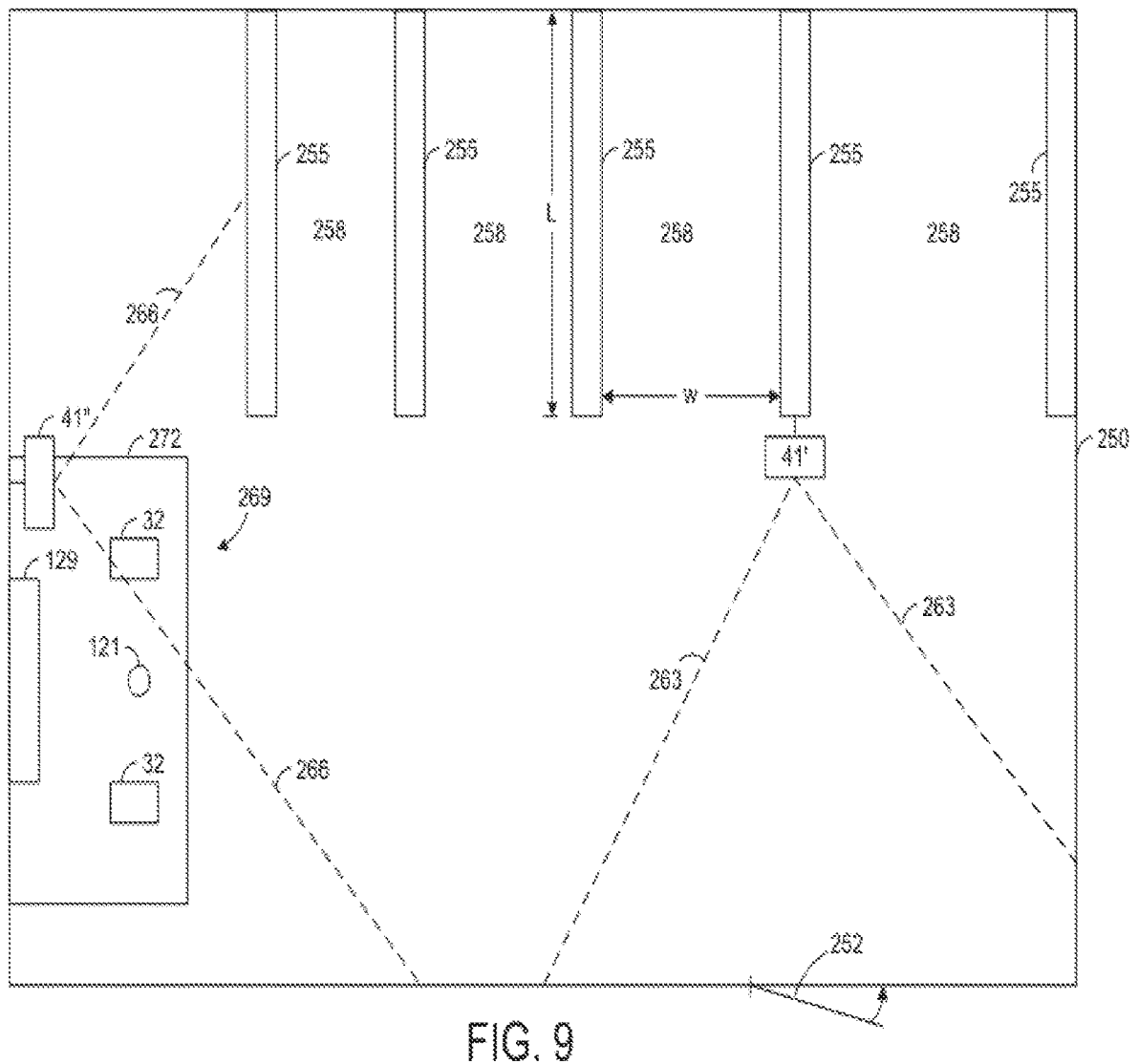
FIG. 9 is a top view of an exemplary layout for a main office of a storage facility, such as is depicted by FIG. 2.

FIG. 9 depicts an exemplary main office 250 of a storage facility 12. The main office 250 has a front door 252 through which a customer may enter the main office 250. As shown by FIG. 9, the main office 250 has a plurality of parallel walls 255 defining spaces 258 between the walls 255. The walls 255 may be sized such that each space 258 represents a sample storage unit. As an example, two walls 255 defining a respective space 258 may be separated by a width (w) that matches a width of a storage unit, and the two walls 255 may have a length (L) that matches a length of such storage unit. Thus, the space 258 defined by the two walls 255 may be the same size as the space defined by a storage unit represented by the space 258. Also, the widths of the different spaces 258 may be different such that each space 258 represents a storage unit of a different size. Thus, by viewing the spaces 258, a customer can visualize the difference between a storage unit of one size relative to a storage unit of a different size. Having the spaces 258 in the main office 250 may help a customer determine which size storage unit will best meet his or her needs.

The camera 63 (FIG. 3) of a sensor node 41' at the main office 250 may have a field of view 263 of one area of the main office 250, such as the front door 252 or other area that a customer enters, and another sensor nodes 41" at the main office 250 may have a field of view 266 of another area of the main office 250 that a user enters to approach the display device 129 of the VC client 22. Thus, the images captured by a camera 63 having the field of view 263 may be used to confirm when a new customer enters the main office 250, and the images captured by a camera 63 having the field of view 266 may be used to determine when a customer has approached the display device 129 or other components of a customer workstation, as will be described in more detail below. In some embodiments, the fields of views 263, 266 of cameras 63 of different sensor nodes 41 may overlap.

Figure 10:
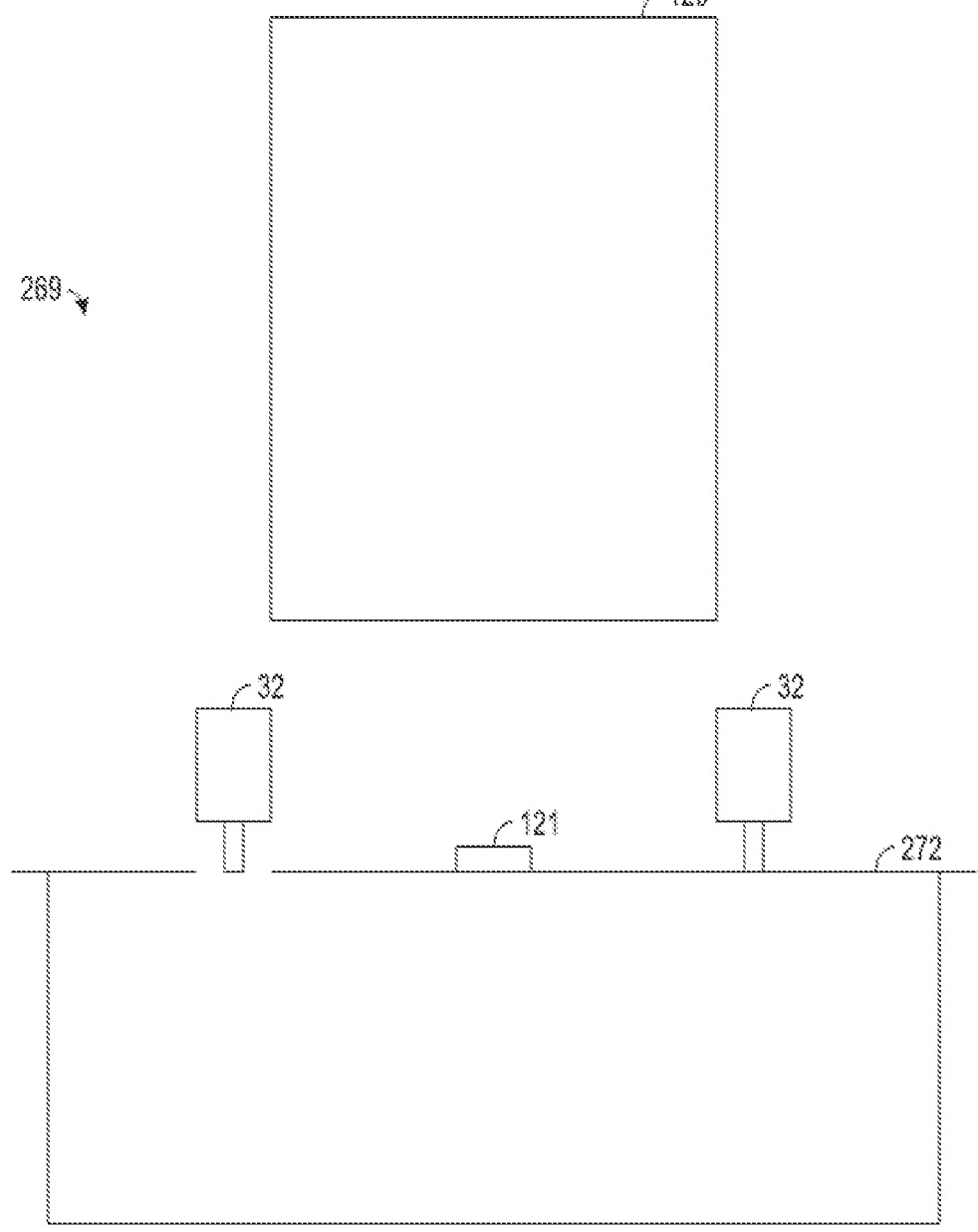
FIG. 10 depicts an exemplary embodiment of a customer workstation, such as is depicted by FIG. 9.

As shown by FIGS. 9 and 10, the main office 250 may have a customer workstation 269 that is used by a customer to interact with a sales agent at the RAS 15 (FIG. 2) and perform other actions, such as providing inputs for renting a storage unit, as will be described in more detail below. The customer workstation 269 may have a counter 272 on which various components reside, such as a user input device 121 (FIG. 5) and one or more computing devices 32 (FIG. 2). In addition, a display device 129 (FIG. 5) for the VC client 22 may be mounted on a wall above the counter 269, although other locations for the foregoing components are possible in other embodiments.

The use of the sensor nodes 41', 41" to provide video surveillance of the main office 250 enables the sales agent at the RAS 15 to closely monitor the actions of the customer so that the sales agent at desired times, based on the actions or behavior of the customer, may engage the customer by initiating a videoconferencing call via the VC server 25 and the VC client 22. As an example, as described above, the sales agent can initiate a call to engage the customer shortly after the customer enters the main office 250 and the sales agent has confirmed via video images that a new customer is in fact on site.

In addition, even after the sales agent has engaged the customer via a videoconferencing session, the sales agent may continue to monitor the customer after the videoconferencing session and re-engage the customer if the sales agent sees that the customer looks confused or appears to be searching for information. Also, if the customer attempts to re-engage the sales agent by approaching the customer workstation 269, the sales agent may notice this behavior and initiate a new videoconferencing session with the customer. Thus, even if the customer is unable to determine how to initiate a call, the sales agent may notice the customer's efforts and proceed with initiating a call. Thus, using video from the sensor nodes 41', 41" helps to provide a very robust customer experience by enabling the sales agent to make better decisions about when to initiate a video conferencing session with the customer. Further, the use of sensor nodes 41', 41" also helps the same sales agent to track activity at many storage facilities 12 even while the sales agent is engaged in a videoconference call with the VC server 25 at his or her workstation 156. In this regard, during a call, the sales agent may still use the computing devices 190 at his or her workstation 156 to view the video images captured by the sensor nodes 41 at other facilities 12.

In order to keep the overall costs low, the sensor nodes 41 may be implemented using known video surveillance systems separate from the VC conferencing system defined by the VC servers 25 and VC clients 22. As an example, in some embodiments, the sensor nodes 41 are implemented with Google Nest® camera nodes sold by Google, LLC. Moreover, it is possible to use an off-the-shelf system, like Google Nest® or other known video surveillance systems, to provide video surveillance while using high-quality video conferencing equipment for the VC clients 22 and VC servers 25. This approach helps to keep the overall costs low while the customer enjoys a rich videoconferencing experience. Indeed, the system 10 can be easily installed without having to custom-design the video surveillance functionality considering that a given computing device 190 at the RAS 15 can be paired with the sensor nodes 41 at the associated storage facility 12 using conventional initialization procedures from the manufacturer of the sensor nodes 41.

In addition, by not relying on the camera 123 (FIG. 5) of the VC client 22 for the video surveillance performed by the sensor nodes 41, better surveillance can be achieved. In particular, the sensor nodes 41 can be strategically positioned for their intended purpose irrespective of the location of the VC client 22. In addition, the number of sensor nodes 41 can be increased to provide greater video coverage at a relatively low cost. In other embodiments, a single, integrated system providing both video surveillance and videoconferencing may be used, and other types of equipment and techniques may be used to provide the video surveillance and videoconferencing described herein.

In some embodiments, the sensor nodes 41 may be used to effectively "throw" the voice of the sales agent to help customers understand whether a verbal message is intended for them. As an example, referring to FIG. 9, assume that a sales agent is engaged with a customer at the VC client 22 in a videoconference call when a new customer enters through the door 252. In such a situation, the sales agent (during the call) may use the computing device 190 at the RAS 15 associated with the facility 12 of the main office 250 to send a verbal message to the new customer who just entered through the door 252. As an example, the sales agent may explain that he or she is on a videoconference call with another customer and will be with the new customer in just a minute.

To help the new customer understand that the message is intended to him or her, the verbal message may be output by the speaker 65 (FIG. 3) of the sensor node 41' that is closest to the new customer. This not only helps the new customer understand that the message is intended for him or her, but it also does not require the customer in the call via the VC client 22 to realize that the sales agent has engaged another customer. In fact, in some embodiments, the verbal message may be pre-recorded or computer-generated so that the sales agent in the call does not even have to speak the verbal message. Alternatively, the sales agent may pause the videoconferencing call, speak the verbal message to the new customer and then resume the videoconferencing call without the customer in the call even realizing that the call has been paused. Yet other techniques for simultaneously engaging multiple customers are possible.

In addition, by using the sensor node 41' to engage the new customer entering the main office 250, it is unnecessary for the sales agent to attempt to get the new customer's attention through the VC client 22, which may be a greater distance away. Indeed, it may be particularly difficult to get the attention of the new customer through the VC client 22 when the VC client 22 is currently being used for a call with another customer. Using the sensor node 41' enables more efficient communication between the sales agent and the new customer. Note that there may be other times when it may be desirable for the sales agent to communicate with a customer through one of the sensor nodes 41 rather than VC client 22.

In some embodiments, a sensor node 41 may be positioned such that the display of the computing device 32 used by a customer at the workstation 269 is in the field of view of the node's camera 63 (FIG. 3). As an example, if the user interface 33 (FIG. 2) of the computing device 32 comprises a display screen, the camera 63 may be positioned such that the display screen is in the camera's field of view. For example, the sensor node 41 may be positioned on the ceiling above the computing device 32, although other locations for the sensor node 41 to achieve this effect are possible.

When the customer is using the computing device 32 to rent a storage unit or perform other action, such as purchasing insurance, for example, the sensor node 41 may transmit to the RAS 15 images of the display from the computing device 32. Such images may be displayed to the sales agent by the computing device 190 associated with the facility 12 or another device at the RAS 15. This information may help the sales agent to see what the customer is seeing on the computing device 32, thereby helping the sales agent to assist the customer as he or she uses the computing device 32. Using a sensor node 41 to provide information on the display of the computing device 32 enables the sales agent to have access to this information without requiring the computing device 32 to be configured to provide it. Thus, it is unnecessary to custom-design the computing device 32 to provide this information, thereby helping to keep the costs of the computing devices 32 low. In other embodiments, it is unnecessary for the sales agent to have access to this information or for the sales agent to obtain such information using other techniques, such as having the computing device 32 transmit it to the RAS 15.

As noted above, it may be generally desirable for the same sales agent to interact with the same customer over multiple calls. This may help the customer to become familiar with the sales agent and may also help the sales agent to better manage any issues or answer any questions that the customer may have. The system 10 may be configured to attempt to route videoconferencing calls for the same customer to the same sales agent as much as possible or desirable based on the workloads of the sales agents. There are various techniques that can be used to help ensure this.

As an example, each workstation 156 at the RAS 15 may serve as a "primary" workstation for a respective group of storage facilities 12. Such a primary workstation 156 for a group of storage facilities 12 has a plurality of computing devices 190 respectively associated with such storage facilities 12. Thus, the sensor nodes 41 at a given storage facility 12 of this group are paired with a respective one of the computing devices 190 at the primary workstation 156. When a new customer is detected at one of these storage facilities 12, an alert is sent to the facility's primary workstation 156. Therefore, as long as the same sales agent remains at this workstation 156, any alert of a new customer should first go to a computing device 190 being monitored by this sales agent. In such an embodiment, if the same customer comes to the same facility 12 multiple times, the same sales agent may receive the alerts for this customer and will have the opportunity to engage the customer as described in more detail herein.

In general, as described above, the sales agent at the primary workstation 156 for a given facility may be expected to monitor the facility 12 and engage the customers at the facility 12. However, if a sales agent at the primary workstation 156 is unavailable for any reason, then a sales agent at another workstation 156, referred to in this example as "secondary workstation," may engage a customer at the facility 12. As an example, a sales agent at the facility's primary workstation 156 may be in a videoconference call with another customer such that he or she may be unable to engage a new customer at the present time. In such case, a sales agent at the secondary workstation 156 may engage the new customer, as will be described in more detail below.

Note that there are various techniques that can be used to notify a sales agent at secondary workstation 156 to engage a new customer. As an example, when the sales agent at the primary workstation 156 for a facility 12 receives an alert of a new customer, such sales agent may use the VC server 25 at the primary workstation 156 to a send a message to the VC server 25 of another sales agent requesting this other sales agent to engage the new customer. Such message may include information identifying the facility 12 where the new customer is located, such as a telephone number or other identifier of the facility 12. In response, the sales agent at the secondary workstation 156 may use the VC server 25 at the secondary workstation 156 to initiate a videoconferencing call with the VC client 22 at the facility 12 where the new customer is located so that the sales agent may engage the new customer in a videoconferencing session. Note that the secondary workstation 156 may be at the same premises as the primary workstation 156, or the primary and secondary workstations may be located at different locations and communicate using a WAN, for example.

In other examples, the hand-off to the sales agent at the secondary workstation 156 may be automatic so that it does not require actions by the sales agent at the primary workstation. As an example, the computing device 190 that is providing the alert for the new customer may be configured to continue providing the alert for at least a predefined amount of time. If the sales agent at the primary workstation 156 fails to provide a user input acknowledging the alert within the predefined time period, the computing device 190 may be configured transmit a message to the secondary workstation 156, as described above, so that the process of engaging the new customer is handed-off to the secondary workstation 156.

In yet another embodiment, the computing device 190 that receives a new customer alert at the primary workstation 156 may notify the VC server 25 at the primary workstation 156 of the alert, and such VC server 25 may handle handing-off of the process for engaging the new customer as described above. Note that such VC server 25 may be aware of whether the sales agent at the primary workstation 156 is available. For example, such VC server 25 may know whether the sales agent at the primary workstation 156 is currently in a videoconference call. Also, the sales agent at the primary workstation 156 may provide a user input indicating whether he or she is unavailable. As an example, if the sales agent takes a break, the sales agent may provide a user input indicating that he or she is not available and then provide another input indicating that he or she is available after returning to the primary workstation 156.

Also, if the sales agent at the primary workstation 156 is in a videoconference call, he or she may provide an input indicating whether the process of engaging the new customer should be handed-off to a secondary workstation 156. For example, in some cases, the sales agent may decide to engage the new customer after the current videoconference call is terminated. Allowing the sales agent at the primary workstation 156 to decide whether or not to hand-off the process of engaging a new customer gives this sales agent the flexibility of deciding whether it is better to hand-off such process or allow the sales agent at the primary workstation 156 to interact with the new customer.

Thus, according to the techniques described above, the sales agent at a primary workstation 156 for a given facility 12 is first notified of the presence of a new customer and has the first opportunity to engage the new customer. If such sales agent is unavailable because the sales agent is involved in a videoconference call, has temporarily left the primary workstation (e.g., is taking a break), or wishes to hand-off engagement of the new customer for any other reason, then a sales agent at another workstation 156 may be instructed or otherwise allowed to engage the new customer.

As noted above, after a videoconference call has occurred with a customer at a storage facility 12, the call may be terminated, and the sales agent in the call may perform various tasks, such as interacting with or monitoring customers at other facilities 12. Further, the customer in the call may similarly perform other activities, such as observing the sample storage spaces 258 (FIG. 9) or taking other actions for evaluating whether to rent a storage unit. In addition, at some point the customer may desire to speak with a sales agent again and provide an input via user input device 121 (FIG. 5) for establishing another videoconference call. In response to such input, the VC client controller 112 is configured to attempt to establish a videoconference call with the same sales agent that previously had a call with the customer. There are various techniques that may be used to try to achieve this.

In this regard, in some embodiments, when a videoconference call is first established with a customer, the VC client controller 112 (FIG. 5) participating in the call is configured to store an identifier of the VC server 25 in the call (e.g., a telephone number, IP address, or other types of information for enabling the VC client controller 112 to initiate a call with such VC server 25). In some embodiments, the identifier may be a key that can be used by the VC client controller 112 to lookup or otherwise find contact information (e.g., a telephone number, IP address, or other types of information for enabling the VC client controller 112 to initiate a call with the identified VC server 25).

When the VC client controller 112 later receives an input from the user input device 121 indicating that the customer desires to establish a call with a sales agent, the VC client controller 112 retrieves the VC server identifier stored from the last call and uses such identifier to attempt to establish a videoconference call with the identified VC server 25, noting that this is likely the VC server 25 that participated in the last call with the customer. Thus, the call will likely be established with the same sales agent that previously spoke to the customer. However, if such sales agent is unavailable for any reason, then the call may instead be established with another VC server 25 so that another sales agent can have a call with the customer, similar to the techniques described above for handing-off engagement of a customer to another sales agent.

In this regard, when the VC client 22 attempts to establish a call with the identified VC server 25, as described above, a call request may be sent from the VC client 22 to the identified VC server 25. If the sales agent at such VC server 25 is available, then the call may be established with this identified VC server 25. However, if the identified VC server 25 determines that the sales agent is unavailable, such as if the VC server 25 is currently in a videoconference call with another VC client 22, then the identified VC server 25 (or other component at the RAS 15) may forward the call request to another VC server 25 for the call.

In other embodiments, other techniques for establishing a videoconference call in response to user input at a VC client 22 are possible. As an example, the VC client controller 112 may be configured to attempt to establish a call with the same VC server 25 (e.g., the VC server 25 of the primary workstation 156 for the facility 12) each time the VC client controller 112 receives a user input for requesting a videoconference call. In addition, in some embodiments, the VC client controller 112 may be configured to identify a customer attempting to request a videoconference call and select a VC server 25 for the call based on the identity of the customer. In this regard, when a video call is established between a customer at a VC client 22 and a sales agent at a VC server 25, the VC client controller 112 may be configured to store an identifier of the customer and correlate the stored customer identifier with an identifier of the VC server 25 participating in the call. Thereafter, when the same customer providers a user input for requesting a new videoconference call, the VC client controller 112 may be configured to determine the identifier of the customer and use such identifier to lookup the identifier of the VC server 25 correlated with such customer identifier. The VC client controller 112 may then attempt to establish a videoconference call with such VC server 25. Thus, each time a videoconference call is requested by the same customer, the VC client controller 112 attempts to establish a videoconference call with the same VC server 25, thereby increasing the likelihood that the call will go to the same sales agent.

Note that there are various techniques that the VC client controller 112 may use to determine the identity of the customer. As an example, the customer may simply enter information (e.g., a user identifier) via the user input device 121 (FIG. 5) or otherwise to indicate the identity of the customer. In another example, the customer may carry a mobile communication device, such as a radio frequency (RF) tag or a smartphone, that is configured to wirelessly communicate with the VC client 22 to inform the VC client controller 112 of the identity of the customer. In yet another embodiment, the VC client controller 112 may be configured to analyze images captured by the camera 123 (FIG. 5) and identify unique features of the customer in the images. As an example, conventional facial recognition techniques may be used to identify the customer in the images. In other embodiments, the VC client 22 may have a biometric sensor, such as a fingerprint or retina sensor, for identifying the customer. Yet other techniques for identifying the customer are possible in other embodiments.

Note that the embodiments described above are exemplary, and various changes or modifications to the described embodiments are possible. As an example, it is unnecessary for multiple computing devices be used to implement a workstation 156. For example, it is possible for the functionality described above for a workstation 156 to be implemented by a single computing device (not shown) that is configured to perform the functions of the computing devices 190 and the VC server 25 described above. Such a single computing device may have a single display device for displaying the information output by the workstation 156, or the single computing device may have a plurality of display devices. As an example, each display device, like the computing devices 190 described above, may be associated with a respective facility 12 and display information from such facility 12 so that a sales agent may determine where a new customer is located by identifying which of the display devices is displaying the customer's image. In such embodiment, a single computing device may render to each of the multiple display devices and also establish videoconference calls as may be desired. In another example, video feeds from different facilities 12 may be displayed in different windows of the same display device. Yet other configurations are possible in other embodiments.

As an example, the use of videoconferencing is unnecessary. In this regard, the system 10 may operate as essentially described above except that teleconferencing is used, rather than videoconferencing, to communicate between customer and sales agents. In such an embodiment, a display device 129 may be omitted, and the customer may simply hear the voice of the sales agent without seeing his or her image. Similarly, the sales agent may hear the voice of the customer without seeing his or her image.

An exemplary use and operation of the system 10 will be described in more detail below.

In this regard, assume that a new customer enters the main office 250 (FIG. 9) of a storage facility 12 through the door 252. Upon entering the main office 250, the customer's presence is sensed by the sensor node 41'. As an example, the customer may be sensed by the proximity sensor 61 (FIG. 3) or based on images captured by the camera 63 (FIG. 3). In response, the sensor node 41' is configured to transmit an alert message indicative of the detection to the computing device 190 (FIG. 6) at the RAS 15 paired with the sensor node 41'. This computing device 190, which is at the primary workstation 156 for the facility 12, then emits an audible (e.g., a series of beeps) or visual (e.g., a textual message) alert to indicate to a sales agent at the primary workstation 156 that a new customer has possibly been detected.

As noted above, the computing device 190 providing the alert may be associated with the storage facility 12 such that the sales agent at the workstation 156 is aware that the information provided by this computing device 190 is from this facility 12. To facilitate such association, each computing device 190 may have a label attached to it indicating the name or other identifier (e.g., telephone number) of the associated storage facility 12.

In response to the alert emitted by the computing device 190 paired with the sensor node 41', the sales agent at the primary workstation 156 may view the image displayed by such computing device 190. As described above, this computing device 190 may be displaying a video stream of the scene captured by the sensor node 41'. Thus, by looking at the displayed image, the sales agent should be able to confirm whether a new customer has entered the main office 250.

If so, the sales agent may decide to initiate a videoconference call with the VC client 22 at the same storage facility 12 in order to engage the new customer. Thus, the sales agent may provide user inputs to the VC server 25 at the primary workstation 156 to establish a videoconference call between such VC server 25 and the VC client 22 at the storage facility 12. Thus, upon the customer entering the main office 250, an image of the sales agent may appear on the display device 129 (FIG. 9) viewable by the customer. Also, the sales agent and the customer may speak to each other in the videoconference call.

As an example, the sales agent may provide the customer with information about renting storage units, and if desired, the customer may ask questions to the sales agent. The sales agent may also explain that the facility 12 is remotely managed and that the customer may initiate a call back to the sales agent by simply providing a user input to the user input device 121 (FIG. 9), such as pushing a button for example. Thereafter, the videoconference call may be terminated.

After termination of the call, the sales agent may continue to monitor the actions of the customer by viewing the video feed captured by either of the sensor nodes 41' or 42", noting that such video feed is displayed by the computing device 190 paired with the nodes 41' and 41". If the sales agent wishes to converse with the customer again, such as if the customer appears as though he or she has a question or otherwise needs assistance, the sales agent may use the VC server 25 at the primary workstation 156 to establish a new videoconference call with the VC client 22 so that the sales agent and the customer may speak via the videoconference call. Alternatively, the sales agent may send a message via any of the sensor nodes 41' or 41" at the facility 12, as described above.

At some point, the customer may desire to speak to the sales agent again and, thus, provide a user input via the user input device 121 to request a call. In response, the VC client 22 may be configured to send a call request to the same VC server 25 used previously for a call, as described in more detail above. If the sales agent is available, such call request may be accepted by the sales agent using the VC server 25 of the primary workstation 156. Alternatively, if the sales agent is not available or otherwise does not wish to have the call, then the call request may be sent to the VC server of another workstation 156 so that a videoconference call may be established with another sales agent.

Eventually, the customer may decide to rent a storage unit at the facility 12. In such case, the customer may use a computing device 32 at the customer workstation 269 to provide information for use in renting the storage unit, such as personal information (e.g., name and address), payment information (e.g., credit card or debit card number), and any other information that may be requested by the owner of the facility 12. During this process, a videoconference call may be established with a sales agent using the techniques described above, and the sales agent may provide advice or information for use by the customer in providing the requested information.

Once the customer has provided the requested information, the customer may be provided instructions by the computing device 32 or otherwise (such as by the sales agent in a videoconference call) on how to access the rented storage unit. As an example, a location of a key for the storage unit may be indicated, thereby enabling the user to retrieve the key and use it to access the rented storage unit. In some embodiments, the storage units have locks that can be controlled by wireless signals. In such case, the customer can be instructed to download an application on his or her smartphone or other computing device, and the application may be configured to retrieve a digital key for the rented storage unit from a remote service, such as from the RAS controller 163 (FIG. 6), for example. The application may be configured to wirelessly transmit the digital key using Bluetooth or some other known wireless protocol to the lock of the rented storage unit to provide the customer access to the storage unit. In other embodiments, other techniques may be used to provide the customer with access to the rented storage unit.

By using techniques described herein, it is possible for a relatively large number of storage facilities 12 to be managed by a relatively small number of sales agents at one or more remote locations. Further, the system 10 for enabling remote management of the storage facilities may be implemented at a relatively low cost but with a rich customer experience so as to encourage customers to use the videoconferencing capabilities of the system 10 and increase the likelihood that the customers will want to rent storage units. By giving tools for the sales agents to monitor and interact with customers, as described herein, the sales agents can effectively address many of the problems associated with remote management of storage facilities, thereby reducing customer frustrations and apprehensions.

Figure 11:
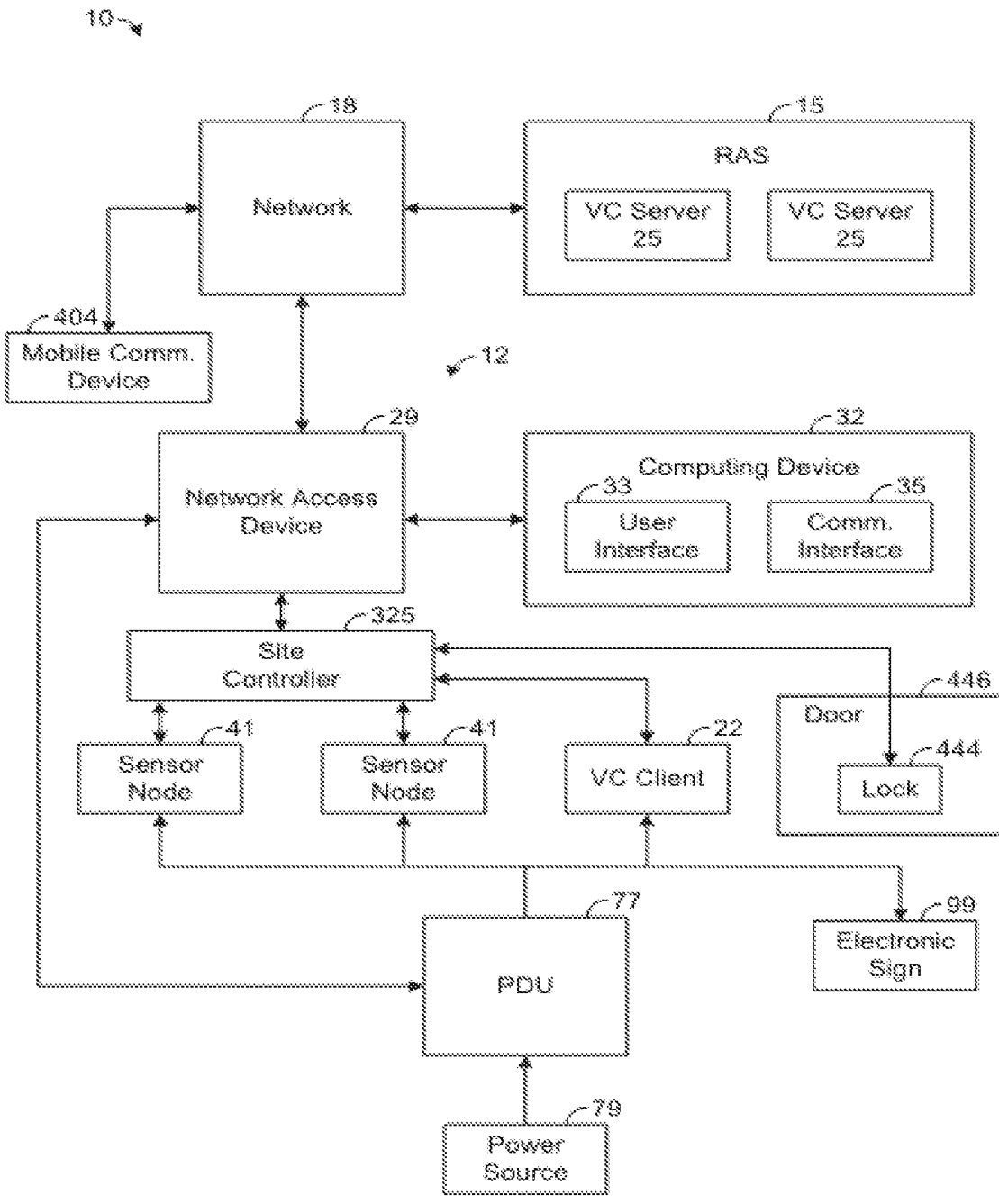
FIG. 11 is a block diagram illustrating an exemplary embodiment of a system, such as is depicted by FIG. 1, for enabling remote management of storage facilities.

Note that various changes or modifications to the embodiments described above are possible. FIG. 11 depicts an embodiment of a storage facility 12 similar or identical to the storage facility 12 described above with reference to FIG. 2 except as is otherwise described below. The storage facility 12 of FIG. 11 has a controller 325, referred to herein as "site controller," that is configured to control various operations and make various decisions at the site of the facility 12, though the controller 325 may reside at other locations in other embodiments. The site controller 325 may be configured in hardware or any combination of hardware and software. As an example, the site controller 325 may comprise at least one processor programmed with instructions that, when executed by the processor, cause the processor to perform the functions ascribed to the site controller 325 herein. The site controller 325 may also comprise at least one communication interface for enabling the site controller 325 to communicate with the network access device 29 and/or any of the system components at the facility 12, such as a sensor node 41, VC client 22, or electronic sign 99 (e.g., using one or more wireless protocols such as Bluetooth or Wi-Fi).

The site controller 325 is configured to receive notices of events occurring at the facility 12 and to take various actions in response to the events. As an example, when a sensor node 41 detects a customer, the sensor node 41 may send a notice of the detected customer, and the site controller 325 may decide whether to take an action in response to the event. As a further example, if a videoconferencing session is to be initiated, the site controller 325 may transmit an alert to the RAS 15, which then initiates a video conferencing session as described above.

Figure 12:
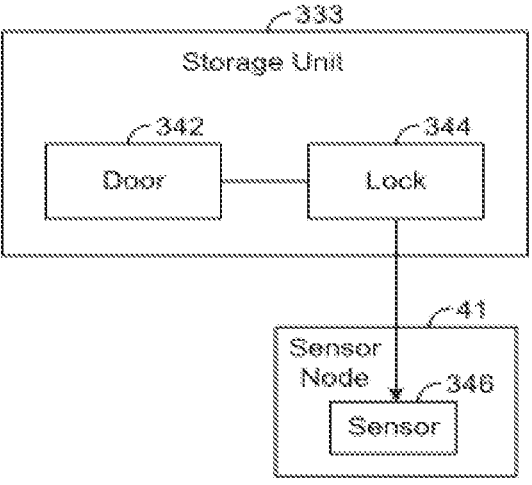
FIG. 12 is a block diagram illustrating an exemplary embodiment of storage unit and a sensor node.

Note that the embodiments of sensor nodes 41 described above are exemplary and sensor nodes 41 may have various configurations. As an example, it is possible for a sensor node 41 to monitor activity at a storage unit and transmit a notice to the site controller 325 when a certain event is detected. FIG. 12 depicts an exemplary storage unit 333 associated with a sensor node 41 that is at the location of the storage unit 333. The storage unit 333 may have a storage space in which a customer may store items, and the storage space may be accessible by a door 342 that is connected to a lock 344. To access the storage space, a customer may transition the lock 344 from a locked state (for which the door 342 is prevented from opening) to an unlocked state, which permits the door to be opened.

The sensor node 41 may have a sensor 346 that can be used to detect when the customer is having trouble unlocking the door 342 (e.g., transitioning the lock 344 from the locked state to the unlocked state so that the door 342 may be opened). As an example, the sensor 346 may be a proximity sensor that senses when the user is in a certain location for an excessive amount of time (e.g., for an amount of time exceeding a predefined threshold), such as near the lock 344. In another example, the sensor 346 may detect movement or vibration of the lock 344 and make a determination that a customer is having a problem with the lock 344 when it is being handled for an excessive amount of time (e.g. longer than a predefined threshold). For example, the sensor 346 may include one or more accelerometers that detect vibrations when the lock 344 is being handled.

When the sensor node 41 determines that a user needs assistance with the lock 344, the node 41 may transmit a notice to the site controller 325, which may be configured to take at least one action in response. As an example, the site controller 325 may transmit an alert to the RAS 15 so that an agent at the RAS 15 may be notified and help address the problem. As an example, the agent may use his or her workstation 156 to establish a communication session with the sensor node 41 and communicate with the user through the sensor node 41 and the agent's workstation 156 (or using other equipment). In other embodiments, the agent may establish a communication session with the customer through the customer's mobile computing device 404, such as a smartphone, which is described in more detail below with particular reference to FIG. 14. In yet other embodiments, other devices may be used to communicate with the customer for assisting him or her with the lock 344 or other issues that the customer may be having.

In some embodiments, the customer's mobile computing device 404 may be used to control the state of the lock 344. For example, the lock 344 may be configured to communicate with the mobile computing device 404 wirelessly or otherwise for receiving information to authenticate the user of the device 404 (e.g., the customer) and to allow the customer to control the state of the clock 344 once he or she is authenticated. In this regard, a communication interface 437 (FIG. 14) of the mobile computing device 404 may be configured for short-range wireless communication (e.g., Bluetooth, NFC, or RFID), thereby allowing control logic 412 (e.g., an application downloaded on the device 404 or other type of software) to communicate with the lock 344. Such control logic 412 may store credentials for authenticating the customer, such as a predefined code, and transmit such credentials to the lock 344, which may then authenticate the customer based on the credentials.

For example, the lock 344 may store the customer's credentials or retrieve the customer's credentials from the site controller 325 or the RAS 15 through the sensor node 41 or otherwise (e.g., RF communication with the site controller 325) and compare the stored or retrieved credentials to those received from the device 404 to determine if they match. If so, the lock 344 may permit its locking state to be controlled by the device 404. Otherwise, until the customer is authenticated, the lock 344 may be configured to remain in the locked state.

In such an embodiment, the customer may use the mobile computing device 404 to change the state of the lock 344, for example, transition the lock 344 to an unlocked state in a variety of ways once he or she has been authenticated. As an example, if NFC is used, the customer may attempt to unlock the lock 344 by tapping the lock 344 or, in other words, placing his or her mobile computing device 404 sufficiently close to the lock 344 to permit wireless communication. When such a tap occurs, the mobile computing device 404 passes the customer's credentials to the lock 344, which then automatically transitions to an unlocked state if the credentials successfully authenticate the customer. In other embodiments, the user may provide a user input for indicating when he or she desires the lock 344 to transition to a locked state or an unlocked state.

As an example, when the mobile computing device 404 and the lock 344 communicate via Bluetooth, RFID, or other type of wireless short-range protocol, the mobile computing device 404 may communicate with the lock 344 to authenticate the customer when the mobile computing device 404 is within range of the lock 344. When the customer desires the lock 344 to transition to an unlocked state, the customer may provide an input to the mobile computing device 404 for causing the lock 344 to transition to an unlocked state. As an example, the control logic 412 of the mobile communication device 412 may display a graphical button (or other type of graphical element) that the customer may select to indicate when the lock 344 to be transitioned to an unlocked state. In response to such input, the control logic 412 may transmit a command to the lock 344 for causing the lock 344 to transition to the unlocked state. In other embodiments, other techniques may be used to unlock the lock 344. In addition, similar techniques may be used to transition the lock 344 to the locked state (e.g., the user may select a graphical button or other graphical element to trigger the transmission of a command to transition the lock 344 to the locked state).

In the instant embodiment, the control logic 412 may be configured to detect when the customer is having a problem with the lock 344 instead of such event being detected by the sensor node 41, as described above. As an example, the control logic 412 may determine that the customer is having a problem with the lock 344 when the customer attempts to unlock the lock 344 more than a threshold number of times (e.g., three) within a certain time period (e.g., 5 minutes). The control logic 412 may detect such attempts in various ways. For example, if NFC is used, each tap of the lock 344 may be interpreted as an attempt to unlock the lock 344. If a user submits a certain input, such as selection of a graphical button or other graphical element, then the reception of such input by the mobile computing device 404 may be interpreted as an attempt to unlock the lock 344. In other embodiments, other actions may be interpreted as an attempt to transition the lock 344 to an unlocked state.

In other examples, other techniques may be used to detect problems with controlling the state of the lock 344. As an example, when a command is transmitted from the mobile computing device 404 to the lock for changing the state of the lock 344, the lock 344 may be configured to reply with an acknowledgement indicating that the command was received. Such acknowledgement may also indicate whether the state of the lock 344 has been successfully controlled as instructed (e.g., successfully transitioned to an unlock state for a command instructing the lock 344 to transition to the unlocked state). The control logic 412 may detect a problem if the message from the lock 344 indicates that the state of the lock 344 has not be successfully changed in response to the command. Yet other techniques may be used to detect problems with the lock 344 that should trigger alerts.

If the control logic 412 detects that the customer is having trouble with the lock, then the control logic 412 may be configured to take at least one action, as described above the sensor node 41. As an example, the control logic 412 may transmit a notice of the event to the site controller 325, which then generates an alert as described above. In other embodiments, the control logic 412 of the mobile computing device 404 or the sensor node 41 (when the sensor node 41 is configured to detect the event) may generate the alert and transmit the alert directly to the RAS 15 without necessarily notifying the site controller 325. Yet other actions may be taken in other embodiments.

As an example, the sensor node 41 or the control logic 412 of the mobile computing device 404 may communicate with the lock 344 in an effort to diagnose the problem. For example, if the lock 344 is in an error state, the lock 344 may communicate information indicative of the error state or type of error, and information indicative of the error may be communicated to the customer audibly or visually by the sensor node 41 or the mobile computing device 404, and such information may also be included in any alert sent to the RAS 15.

In other examples, other types of events may be detected for the purpose of generating alert that is communicated to the RAS 15. As an example, the parking lot of the facility 12 may have a gate that should remained closed except when it is being used by a customer to access the premises. Such a gate may be connected to a sensor of a sensor node 41 that detects whether the gate is closed or open. If the gate remains open for an excessive amount of time (e.g. longer than a predetermined threshold), the node 41 may transmit a notification to the site controller 325, which may then send an alert to the RAS 15. Yet other types of alerts for other events are possible.

Each alert transmitted by the site controller 325 may include various information to help the RAS controller 163 process the alert, including selecting which agent at the RAS 15 is to receive the alert. As an example, the alert may include information (e.g., facility name or other type of identifier) indicating the facility 12 from which the alert has been generated or is otherwise associated, the time of the detection of the event that triggered the alert, and the alert type indicative of the sensed event that triggered the alert.

In some embodiments described above, an agent workstation 156 is described as having multiple computing devices 190, but in other embodiments, other configurations are possible. Indeed, if desired, a given workstation 156 may have a single computing device 190. When an alert is received by the RAS 15, such as an alert indicating that a customer is entering a facility, approaching the VC client 22 (FIG. 11), requesting a videoconferencing session, or having a problem with a lock 344 of a storage unit 333, the RAS controller 163 may be configured to select which agent is to receive the alert and to send the alert to the selected agent by transmitting the alert to one or more computing devices 190 at the agent's workstation 156 or otherwise associated with the agent. As will be described in more detail below, such agent may then accept the alert at which point a videoconferencing call may be initiated through the agent's VC server 25 or not accept the alert, such as when the agent is busy on another task, at which point the RAS 163 may select a different agent and forward the alert to the other agent.

In some embodiments, the RAS controller 163 stores data 363, referred to herein as "alert selection data." Such data 363 may be used by the control logic 203 of the RAS controller 163 to select which agent is to receive a specific alert. As an example, it is possible that certain agents may be preferred for addressing certain types of alerts depending on various factors, such as the skillset of the agents and the facility 12 that is associated with the alert, and the control logic 203 may be configured to select an agent that is correlated with the alert type and/or the facility 12 by the data 363.

In some embodiments, the alert selection data 363 may include a listing of agents available for servicing alerts. In the data 363, the agents may be grouped into various classes. As an example, agents who have been identified for interacting with new customers (e.g., who have demonstrated a strong ability to make sales or who have been trained to make sales) may be grouped into a first class (referred to hereafter as "Class A") that is correlated in the data 363 with an alert type indicating that a customer has entered a main office or is approaching the VC client 22. Each such agent may be further grouped into a subclass that is associated with a certain facility 12 or set of facilities 12.

For example, if an agent is familiar with a particular facility 12 or set of facilities 12, the agent may be grouped into a subclass correlated with such facility 12 or set of facilities 12. When an alert is received that is of a type correlated with the class and subclass for a group of agents, the control logic 203 may select an agent from such class and subclass to service the alert. As an example, assume that a group of users have been selected as ideal for selling storage units at a particular set of facilities 12. Such selection could be based on the skillsets of agents (e.g., perceived ability or training to make sales) and their familiarity with the particular set of facilities 12. When an alert indicating that a new customer has entered a main office of one such facility 12, the control logic 203 may be configured to select one of these ideal agents to service the alert based on the agent classifications indicated by the data 363. Specifically, the control logic 203 may select an agent that, according to the classifications indicated by the data 363, is correlated with the alert type of the alert and the facility 12 associated with the alert.

In another example, agents who have been identified for solving technical issues, such as problems with locks of storage units (e.g., who have demonstrated a strong technical ability or who have been trained to address technical problems) may be grouped into a different class (referred to hereafter as "Class B") that is correlated in the data 363 with an alert type indicating that a customer has technical problem (e.g., a problem unlocking lock 344 of a storage unit 333). Each such agent may be further grouped into a subclass that is associated with a certain facility 12 or set of facilities 12.

For example, if an agent is familiar with a particular facility 12 or set of facilities 12, the agent may be grouped into a subclass correlated with such facility 12 or set of facilities 12. When an alert is received that is of a type correlated with the class and subclass for a group of agents, the control logic 203 may select an agent from such class and subclass to service the alert. As an example, assume that a group of users have been selected as ideal for addressing technical issues at a particular set of facilities 12. Such selection could be based on the skillsets of agents (e.g., perceived ability or training to address technical problems) and their familiarity with the particular set of facilities 12. When an alert indicating that a customer is having a technical problem, the control logic 203 may be configured to select one of these ideal agents to service the alert based on the agent classifications indicated by the data 363. Specifically, the control logic 203 may select an agent that, according to the classifications indicated by the data 363, is correlated with the alert type of the alert and the facility 12 associated with the alert.

Thus, as illustrated in the above examples, selection of an agent to service a particular alert may be based on several factors, including alert type and the facility 12 from which the alert was generated. Specifically, an alert may be forwarded to an agent who, based the alert type and/or facility 12 associated with the alert, is deemed to be best suited for servicing the alert.

Figure 13:
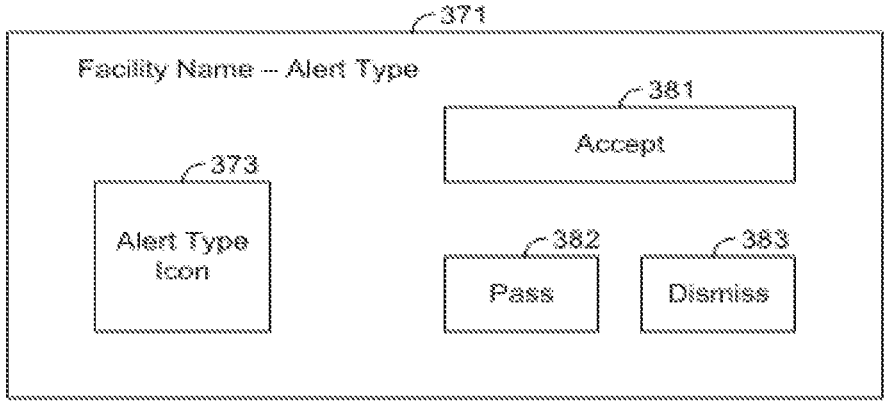
FIG. 13 depicts an exemplary graphical user interface (GUI) for displaying an alert to an agent.

Once an agent is selected for a given alert, the control logic 203 of the RAS controller 163 is configured to transmit the alert to a computing device 190 associated with the selected agent (e.g., a computing device 190 at the agent's workstation 156). In response, the computing device 190 is configured to display a graphical user interface (GUI) indicative of the alert. FIG. 13 depicts an exemplary GUI 371 that may be displayed for an alert. As shown by FIG. 13, the GUI 371 includes information (e.g., text, such as facility name) that identifies the facility 12 associated with the alert (e.g., from which the alert was generated) and indicates the alert type. The GUI 371 also includes a graphical element 373 (e.g., an icon) that graphically indicates the alert type. As an example, if the alert is for indicating that a door or gate is open, the icon may graphically depict a door or gate that appears to be open.

As shown by FIG. 13, the GUI 371 also has a plurality of selectable elements 381-383 that the agent may select to indicate whether he or she will service the alert. As an example, an element 381 (e.g., a graphical button or icon) may be selected to indicate that the agent accepts the alert. An element 383 (e.g., a graphical button or icon) may be selected to indicate that the alert should be dismissed, and an element 382 (e.g., a graphical button or icon) may be selected to indicate that the agent passes on the alert. When the agent passes on the alert, the alert may be re-assigned by the control logic 203 of the RAS controller 163. As an example, if the agent is busy or otherwise unable to accept the alert but the alert should nevertheless be addressed, the agent may select the graphical element 382, referred to hereafter as the "pass element." In response, the agent's computing device 190 is configured to transmit to the RAS controller 163 a message indicating that the agent has passed on the alert. In response, the control logic 203 of the RAS controller 163 is configured to select another agent to service the alert and forward the alert to the other agent. This process may continue until an agent indicates that he or she accepts the alert.

Once an agent accepts the alert by selecting the graphical element 381, referred to hereafter as the "accept element," the agent's computing device 190 is configured to take one or more actions for assisting the agent to service the alert. As an example, the computing device 190 may be configured to display to the agent information about the facility 12 that is associated with the alert (e.g., from which the alert was generated). As an example, the computing device 190 may be configured to display the name (or other identifier) of the facility 12, an address of the facility 12, a facility type, a value indicating a total number of storage units or certain types of storage units at the facility 12, a layout (e.g., map) of the facility 12, codes (e.g., access codes) used at the facility, types of equipment at the facility 12, or other information that may be useful to the agent in servicing the alert.

Note that the facility information displayed to the agent may be stored at the agent's computing device 190 or may be received by the agent's computing device 190 from another location. As an example, referring to FIG. 8, facility information 388 may be stored by the RAS controller 163 and provided by the RAS controller 163 to the agent's computing device 190. In this regard, the facility information 388 may include information on all of the facilities 12 of the system. When an alert is transmitted to an agent's computing device 190, the control logic 203 may retrieve facility information 388 associated with the facility 12 associated with the alert and provide this facility information to the agent's computing device 190 along with the alert. Alternatively, when the alert is accepted, the agent's computing device 388 may send a message indicating acceptance of the alert to the RAS controller 163, which in response may send the associated facility information 388 to the agent's computing device 190. In other embodiments, other techniques for providing facility information 388 to the agent's computing device 190 are possible.

As noted above, at least some alerts involve establishing a videoconference call with a customer at the associated facility 12 and the agent who is handling the alert. If such an alert is accepted by an agent, then the agent's computing device 190 (in addition to displaying information about the associated facility 12) is configured to initiate a videoconferencing session between the agent's VC server 25 at his or her workstation 156 and the VC client 22 at the associated facility 12. As an example, as described above, such a videoconferencing session may be initiated when a customer enters a main office, a customer approaches the VC client 22, or other event occurs.

In some embodiments, to initiate a videoconferencing session, the agent's computing device 190 may be configured to communicate with the agent's VC server 25 using an application programmatic interface (API) of videoconferencing software stored in the VC server controller 172 or otherwise to request a videoconferencing session to be established. In making such request, the agent's computing device 190 may pass certain information used to establish such a videoconferencing session, such as an IP address, telephone number, or other information associated with the VC client 22 to be called, so that the VC server controller 172 can establish a videoconferencing session with the VC client 22.

Note that this information of the VC client 22 may be stored at the agent's computing device 190 and retrieved as appropriate when a videoconferencing session is to be established. Alternatively, such information may be stored and accessed from other locations. As an example, the information may be stored at the RAS controller 163 and sent to the agent's computing device 190 when the alert is sent to the computing device 190 or when the alert is accepted by the agent. Further, note that, as the agent is communicating with the customer through the VC server 25, the agent may use his or her computing device 190 to view the information about the facility 12 that is being displayed, as described above, thereby helping the agent to address the customer's issues.

In some cases, upon receiving an alert, an agent may make a determination that the alert should be dismissed without further processing of the alert. As an example, an alert may be received indicating that a gate has been open for an excessive amount of time. The agent may be aware that a technician has already been dispatched to repair the gate and, thus, no action in response to the alert is necessary. In such a case, the agent may select the graphical element 383, referred to hereafter as the "dismiss element," indicating that the alert may be dismissed. In response, the agent computing device 190 is configured to send to the RAS controller 163 a notice indicating that the alert should be dismissed. In response, the RAS controller 163 may terminate the alert without attempting to re-assign it to another agent.

As noted above, efforts may be made to attempt to route alerts or videoconferencing calls associated with the same customer to the same agent. Such efforts may involve the VC client 22 attempting to call a certain agent, as described above, or the RAS controller 163 may attempt to route an alert for a certain customer to a certain agent (such as an agent who has been assigned to that customer or who has recently assisted the same customer in the past). As part of these efforts, an identifier of the customer may be correlated with an identifier of the agent, and such correlation may be used to route an alert or call to the identified agent. As an example, the alert selection data 363 may correlate an identifier of a certain customer with an identifier of a certain agent, such as an agent who has been assigned to such customer. In some cases, an alert from a facility 12 may include the customer identifier of the customer who is associated with the alert. Such customer identifier may be used by the control logic 203 of the RAS controller 163 to select the agent correlated with the customer identifier by the data 363 for handling the alert.

Figure 14:
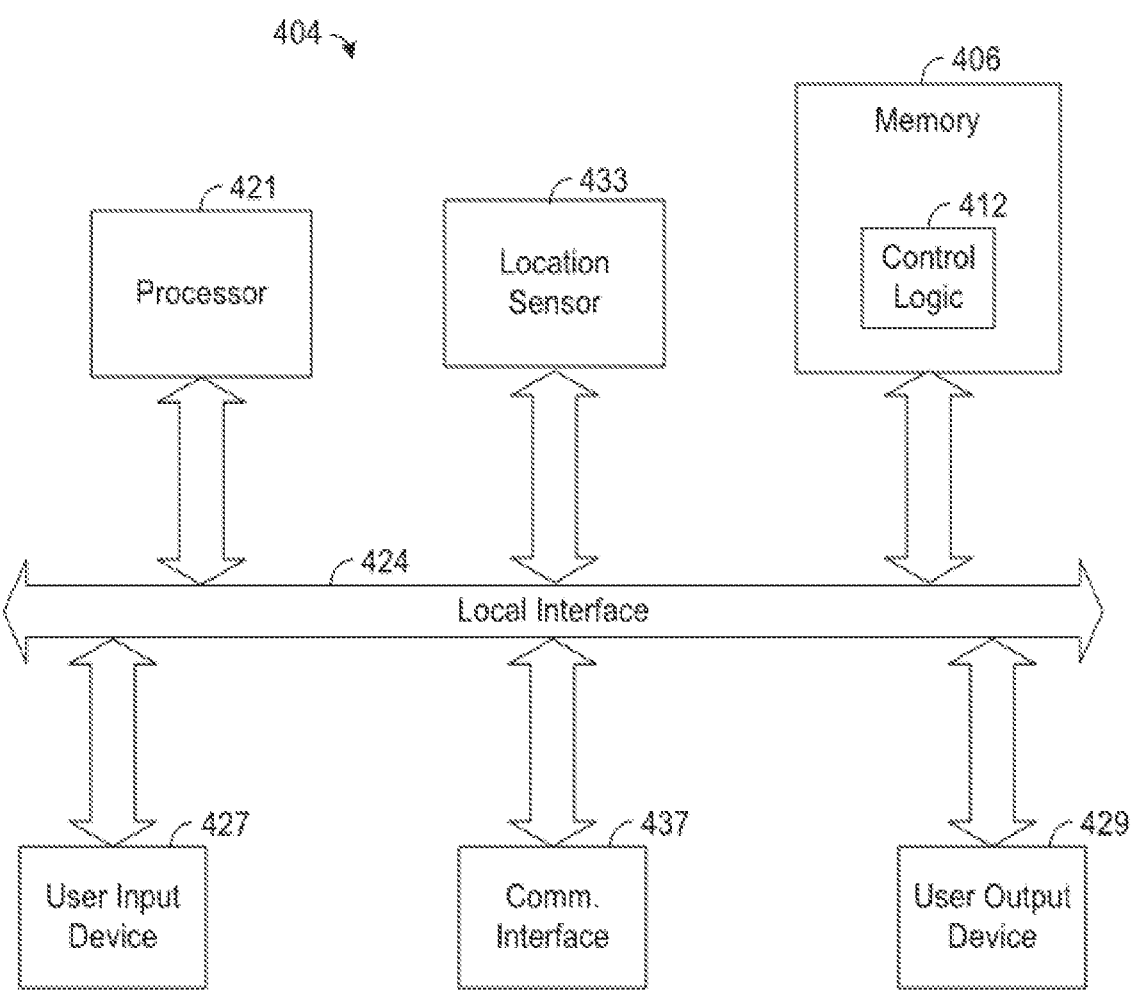
FIG. 14 is a block diagram illustrating an exemplary embodiment of mobile communication device, such as is depicted by FIG. 11.

As further noted above, there are various techniques that can be used to identify a customer so that the appropriate customer identifier can be correlated with an alert. In some embodiments, a mobile communication device 404 (FIG. 11), such as a smartphone or other computing device, of the customer is used to help identify the customer. FIG. 14 depicts an exemplary embodiment of the mobile communication device 404. As shown by FIG. 14, the mobile communication device 404 comprises control logic 412 for generally controlling the operation of the mobile communication device 404, as will be described in more detail hereafter. The control logic 412 can be implemented in software, hardware, or any combination thereof. In the exemplary mobile communication device 404 illustrated by FIG. 14, the control logic 412 is implemented in software and stored in memory 416 of the device 404. As an example, the control logic 412 may be implemented as a software application ("app") stored on the mobile communication device 404.

The exemplary mobile communication device depicted by FIG. 14 comprises at least one conventional processor 421, such as a digital signal processor (DSP) or a central processing unit (CPU), that communicates to and drives the other elements within the mobile communication device 404 via a local interface 424, which can include at least one bus. Furthermore, a user input device 427, for example, a keyboard, keypad, mouse, or other types of known input devices can be used to input data from a user of the mobile communication device 404, and a user output device 429, for example, a printer, monitor, liquid crystal display (LCD), or other display apparatus, can be used to output data to the user. In some embodiments, the user input device 427 and the user output device 429 may share resources that are integrated together. As an example, a touchscreen may be used to implement both the user input device 427 and the user output device 429.

Further, a communication interface 437 is configured to communicate with the external devices. As an example, the communication interface 437 may comprise a cellular transceiver for communicating with the network 18. The communication interface 437 may also comprise a short-range transceiver, such as Wi-Fi or Bluetooth, to communicate with components at a facility 12, such as the site controller 325 or a sensor node 41. The mobile communication device 404 may also having a location sensor 433, such as a GPS sensor, that may be used to determine the location of the device 404. In other embodiments, the mobile communication device 404 may have other configurations as may be desired.

The control logic 412 of the mobile communication device 404 may store an identifier of the customer associated with the device 404, such as the telephone number of the mobile communication device 404 or other identifier that can be recognized by the RAS controller 163. While at the facility 12 (e.g., when in range with the site controller 325 or a sensor node 41), the control logic 412 may be configured to provide the customer identifier along with location information indicating the customer's location based on the location sensor 433 or otherwise. Thus, site controller 325 can track the customer at the facility 12, and based on such tracking, associate the customer identifier with an alert that is transmitted to the RAS 15.

As an example, if the site controller 325 determines that an alert is to be generated to initiate a videoconferencing call with the VC client 22 because a person has entered a main office, approached the VC client 22, or otherwise, the site controller 325 can identify the customer that triggered the alert based on the customer identifier and location information provided to the site controller 325 from the customer's mobile communication device 404. In transmitting the alert, the site controller 325 may associate the alert with the customer identifier (e.g., include the customer identifier in the alert) so that RAS controller 163 can identify the customer who triggered the alert. As noted above, the control logic 203 of the RAS controller 163 may then use the customer's identifier to select an agent for handling the alert.

Note that, in some embodiments, the location of the customer associated with an alert may be used as a factor in selecting which agent is to receive the alert. As an example, assume that the control logic 412 of the mobile communication device 404 permits the user to submit an input for calling (e.g., establishing a telephone call) with an agent. Further assume that, if the call is placed at the site of the facility 12 associated with the customer (e.g., where the customer has rented a storage unit), then it is desirable for the call to be routed to a first set of agents, such as agents familiar with the facility 12 or who have interacted with the customer before. However, if the call is placed at a location remote for the facility 12, assume that it is desirable for the call to be routed to a different set of agents, such as agents that are trained to field general questions and might be less familiar with the facility 12 that is associated with the customer. By handling calls in this manner, the availability of the first set of agents may be better reserved for handling calls from customers who are experiencing issues at the site of the facility 12.

When the mobile communication device 404 is used to place a call to the system, the call may be routed to the RAS 15, and the RAS controller 163 may be configured to generate an alert indicating that an incoming call has been received. When the call is placed, the control logic 412 of the mobile communication device 404 may be configured to transmit the customer's location (along with his or her identifier) to the system, such as the RAS 15. As noted above, the customer identifier may be the user's phone number, which may be matched to the incoming call received by the RAS 15. That is, based on the customer's identifier (which is included in the received call and the message from the mobile communication device 404 indicative of the customer's location) the RAS controller 163 may be configured to determine, not just the identity of the customer making the call, but also the customer's location. If the location in within a predefined area, such as a boundary around the facility 12 associated with the customer (thereby indicating that the customer is at the site of the facility 12), the control logic 203 of the RAS controller 163 may be configured select from a first group of agents to send the call alert. Such selection may be based on other factors, such as which of the first group of agents is/are correlated with the customer's identifier in the alert selection data 363.

However, if the location is not within the predefined area (e.g., indicating that the customer is off-site), then the control logic 203 of the RAS controller 163 may be configured to select from a second group of agents to send the call alert. In addition, the control logic 203 of the RAS controller 163 may be configured to transmit the call alert to a computing device 190 of the selected agent. If the call alert is accepted, then the control logic 203 of the RAS controller 163 may be configured to forward the call to equipment of the accepting agent thereby establishing a call between the accepting agent and the customer. Note that such equipment could be the same computing device 190 used by the agent to accept the alert (e.g., if the computing device 190 is a smartphone or other computing calls capable of establishing phone calls) or a different set of equipment. For example, it is possible for a videoconferencing call to be established with the VC server 25 of the agent's workstation 156, as described above when a videoconferencing call is being established with a VC client 22 at a facility 12. In addition, it should be noted that selection of agents for other types of alerts may be based on the location of the customer who triggered the alert.

As indicated above, the RAS 15 and, specifically, the RAS controller 163 may be configured to receive calls, such as calls from customers, and route the calls to agents based on various factors. Having the RAS controller 163 to make the decisions for routing calls allows the RAS controller 163 to utilize the information tracked by it for the purpose of selecting a desirable agent to handle an incoming call.

For example, as described in more detail herein, the control logic 203 of the RAS controller 163 is configured to track the status of agents to determine which agents are available for handling alerts for certain events, such as receiving a call. As an example, an agent may use his or her workstation 156 to provide a user input indicating whether he or she is available for handling alerts (e.g., calls). In this regard, the agent may indicate days when he or she is not working (e.g., on vacation) or when the agent is engaged in other activities (e.g., meetings or other work-related tasks) and thus unable to handle alerts. The control logic 203 of the RAS controller 163 may also be configured to track the activities of the agent to determine time periods when he or she is unavailable. For example, the control logic 203 may determine when the agent is on a call with a customer and, thus, determine that the agent is not available for handling at least some types of alerts (e.g., calls from other customers or alerts indicting that customer is having trouble with a lock of a storage unit) while the agent remains on the call. When an agent is unavailable for receiving an incoming call, the control logic 203 may remove such agent from the list of available agents for the call so the he or she is not selected for handling the incoming call or receiving an alert for the incoming. Thus, an alert for the incoming call should be sent to another agent who is available for handling the incoming call, and such other agent may be given the option of accepting the alert so that the call is routed to him or her.

Note that there are various techniques and factors that may be used to select an agent for handling an incoming call. For example, as described above, it is possible for the control logic 203 of the RAS controller 163 to determine the identity of the customer making the call (e.g., the incoming call may include information identifying the customer) and/or the location of the customer. Based on this information, the control logic 203 may select an optimal agent for receiving the call. In some embodiments, the control logic 203 may associate the incoming call with a specific storage facility 12, and the control logic 203 may restrict the pool of available agents based on such storage facility 12. For example, the pool may be restricted such that agents unfamiliar with the storage facility 12 or assigned only to other storage facilities 12 are not included in the pool of available agents.

There are various techniques that can be used to associate an incoming call with a specific facility 12. For example, if the call is placed with equipment at a facility 12, the control logic 203 may be configured to associate the call with such facility 12. As noted above, if the location of the customer placing the call is known to the control logic 203 and if the customer is at or near a particular storage facility 12, the control logic 203 may use the customer's location to associate the incoming call with such facility 12. In some embodiments, the telephone number for the call may be used to associate the incoming call with a specific facility 12. As an example, a given facility 12 may be associated with a certain telephone number or a set of telephone numbers that are published (e.g., on a website or telephone directory). If a customer wishes to speak to an agent about a particular facility 12 (e.g., renting at the facility 12 or accessing storage units at the facility 12), the customer may look up or otherwise determine a telephone number associated with the facility 12, and use the telephone number to place call. The network 18 may be configured to route such call to the RAS 15, and the control logic 203 may use the telephone number of the call to determine that the incoming call is related to the facility 12 associated with the telephone number. Thus, based on the telephone number for the call, the control logic 203 may be configured to restrict the pool of available agents for handling the call. In other embodiments, other techniques for restricting the pool of agents for various alerts are possible.

To further illustrate techniques that may be used to select an agent in an effort to have a familiar agent assist a customer, assume a situation in which a customer has had trouble unlocking the lock 344 (FIG. 12) of his storage unit 333, and has been assisted with this issue by a particular agent, referred to hereafter as "Agent A." In such an example, the agent selection data 363 stored at the RAS controller 163 may indicate that Agent A is in a class of agents for addressing alerts related to technical issues, such as problems with locks 344 of storage units 333. When the Agent A accepts an alert to assist the customer with the lock 344, the agent selection data 363 may be updated to correlate Agent A with the customer. As an example, the agent selection data 363 may include a history of alerts and, for each alert, indicate various information, such as alert type, the date and time of the alert, the customer associated with the alert, and the agent who accepted the alert. Such history may be used to help select agents for alerts, as will be further illustrated below.

A few days after being assisted with Agent A, assume that the same customer returns to his or her storage unit 333 and again experiences problems with unlocking the lock 344 of his or her storage unit 333. Further, assume that a sensor node 41 at or near the location of the storage unit 333 senses an event indicating that customer may have a problem with opening his or her storage unit 333. As an example, the sensor node 41 may have a sensor 346 (e.g., a proximity sensor or a camera) that can be used to determine that a user is close to the storage unit 333 for at least a predefined amount of time. In other embodiments, other techniques may be used to sense an event for triggering an alert. As an example, the sensor node 41 may have a sensor 346 coupled to or in communication with the lock 334 for detecting when a user attempts to unlock the lock 334 (e.g., attempts to enter a code for unlocking the lock 334).

When the node controller 52 (FIG. 3) of the sensor node 41 determines an occurrence of an event indicating that the customer may be having trouble accessing his or her storage unit 333, the node controller 52 notifies the site controller 325 of the event. Note that such notice may include not only information indicating that type and time of event detected but also information about the customer experiencing the problem or issue that triggered the event detection. As an example, as noted above, the sensor node 41 may determine the identity of the customer and transmit an identifier of the customer to the site controller 325 with the event notification.

As noted above, such identity could be determined in various ways. As an example, control logic 412 (FIG. 14) of a mobile communication device 444 may wirelessly transmit an identifier of the customer to the node controller 52 of the sensor node 41 using Bluetooth or some other wireless protocol. In other examples, other techniques could be used, such as facial recognition. In some embodiments, the sensor node 41 may provide an identifier of the storage unit 333 associated with the problem, and such identifier may be used to determine the identifier of the customer (e.g., assume that the owner of the storage unit 333 is the person who is experiencing a problem accessing it). Yet other techniques for determining the identity of the customer are possible.

In response to the event notification from the sensor node 41, the site controller 325 may send an alert (including the identifier of the customer associated with the alert) to the RAS controller 163, which then consults the agent selection data 363 to select an agent for servicing the alert. Based on the alert type, the control logic 203 of the RAS controller 163 identifies a group of candidate agents for servicing the alert, noting that Agent A is within such group. As noted above, such group may be a class of agents who are correlated with the alert type, such as agents who are adept at or trained for addressing issues related to the alert type.

The control logic 203 of the RAS controller 163 may further analyze the agent selection data 363 to determine if any of the candidate agents are correlated with the customer identified by the alert. In the current case, the agent selection data 363 indicates that the identified customer was recently assisted by Agent A. Based on such determination, the control logic of the RAS controller 163 may be configured to select Agent A from the candidate agents for servicing the alert.

Once Agent A has been selected, the control logic 203 of the RAS controller 163 is configured to send the alert to Agent A for acceptance, and Agent A may thereafter accept and service the alert using techniques described above. Thus, in the current example, the alert is, not only sent to agent within an optimal class of agents for the alert type, but also is sent to agent who has previously assisted the customer with the same or similar problem or issue.

In the instant example, there are various ways that Agent A may assist the customer. As an example, when the alert is accepted by Agent A, the computing device 190 of Agent A may be configured to initiate a call between Agent A and the customer. As an example, a call to the sensor node 41 could be established where the speaker 65 and microphone 67

(FIG. 3) of the sensor node 41 are used for communication between the customer and Agent A. In another example, a telephone call to the mobile communication device 404 of the customer can be established. In other examples, yet other techniques for enabling communication between the customer and the selected agent are possible.

As noted above, the facility 12 may include an electronic sign 99 that may be controlled remotely by an agent at the RAS 15. In some embodiments, one or more electronic signs 99 may be controlled along with one or more door locks for controlling an open/close state of the facility 12 or at least an area of the facility 12, such as a main office. For example, referring to FIG. 11, the site controller 325 may be configured to communicate wirelessly or otherwise with a lock 444 of a door 446 and the PDU 77 that is connected to an electronic sign 99 (e.g., a sign 99 that indicates whether the facility 12 is open). For example, when the facility 12 is closed, the lock 444 may be in a locked state, which prevents the door 446 from being opened. In addition, the sign 99 may be deactivated. Specifically, the PDU 77 may prevent power from the power source 79 from reaching the sign 99 so that it is not illuminated.

If an agent at the RAS 15 desires to open the facility 12, the agent may provide an input using his or her computing device 190 that causes a command, referred to herein as "open" command, to be sent to the site controller 325. Such open command could be transmitted from the agent's computing device 190, or the agent's computing device 190 could communicate with the RAS controller 163 to cause such controller 163 to transmit the open command to the site controller 325.

In response to the open command, the site controller 325 may communicate with the lock 444 to transition it from the locked state to an opened state for which the door 446 may be opened, thereby allowing people (e.g., customers) to enter the facility through the doorway. The site controller 325 may also communicate with the PDU 77 to cause it to permit current to flow from the power source 79 through the PDU 77 to the electronic sign 99, thereby powering at least one light source of the sign 99 such that it is illuminated (e.g., displaying an "open" message, thereby indicating that the facility is open).

If an agent at the RAS 15 desires to close the facility 12, the agent may provide an input using his or her computing device 190 that causes a command, referred to herein as "close" command, to be sent to the site controller 325. Such close command could be transmitted from the agent's computing device 190, or the agent's computing device 190 could communicate with the RAS controller 163 to cause such controller 163 to transmit the close command to the site controller 325.

In response to the close command, the site controller 325 may communicate with the lock 444 to transition it from the opened state to the locked state for which the lock 444 may prevent the door 446 from opening, thereby preventing people (e.g., customers) from entering the facility 12 through the doorway. The site controller 325 may also communicate with the PDU 77 to cause it to prevent current from flowing from the power source 79 through the PDU 77 to the electronic sign 99 so that the sign 99 is not illuminated. Thus, from a remote location, an agent at the RAS 15 may selectively control whether the facility 12 opened or closed.

Figure 15:
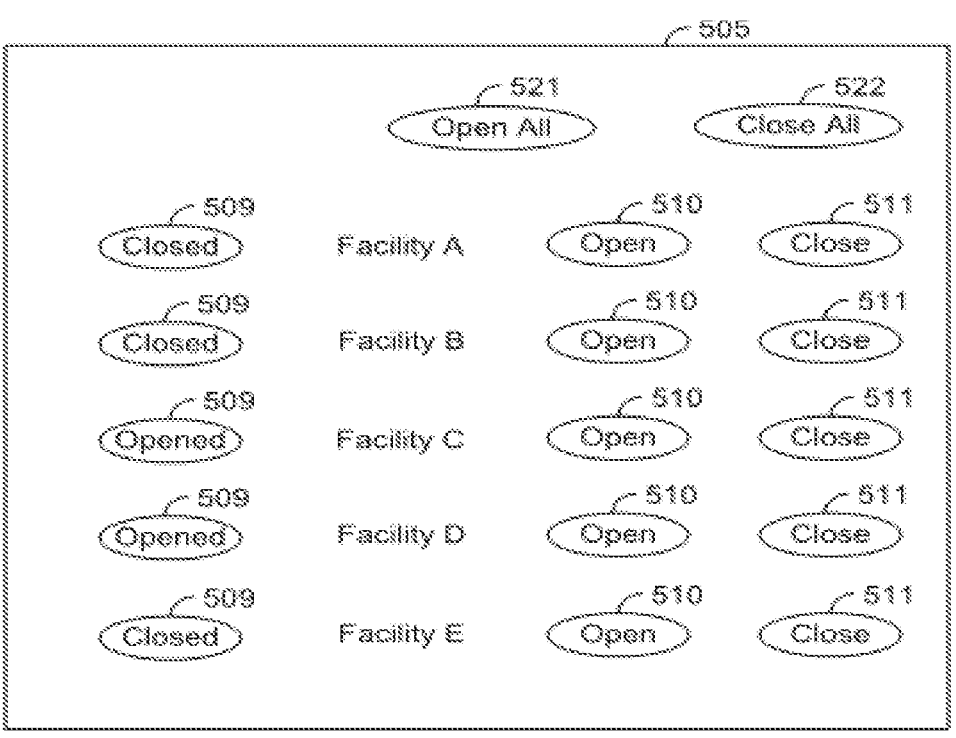
FIG. 15 depicts an exemplary GUI to assist with controlling the open/close state of a plurality of facilities.

FIG. 15 depicts an exemplary GUI 505 that may be displayed to an agent by his or her computing device 190 to assist with controlling the open/close states of a plurality of facilities. In this regard, the GUI 505 lists a group of facilities 12 (e.g., indicates each facility 12 by name or other identifier). Next to the name of each facility 12 is a graphical element 509 indicating the current open/close state of the facility 12. For example, if the facility 12 is currently closed, the graphical element 509 (e.g., icon) corresponding to the facility 12 may be controlled to display certain text (e.g., "closed"), may be color coded to indicate a closed state, or may be otherwise controlled to indicate a closed state. If the facility 12 is currently open, the graphical element 509 corresponding to the facility 12 may be controlled to display certain text (e.g., "opened"), may be color coded to indicate an opened state, or may be otherwise controlled to indicate an opened state. As an example, graphical elements 509 corresponding to facilities 12 that are opened may be colored green (or some other color) while graphical elements 509 corresponding to facilities 12 that are closed may be colored red (or some other color).

On the same line, each facility 12 may also be associated with a pair of graphical elements 510, 511 (e.g., icons) that may be selected to control the open/close state of the facility 12. For example, if the agent wishes to transition a facility to an opened state, the agent may select the graphical element 510 corresponding to the facility 12 to be opened. Such an action causes an open command to be sent to the facility 12, as described above to put the door lock 444 in the opened state and to illuminate the sign 99. In addition, the state of the graphical element 509 for the facility 12 is changed to indicate that the facility 12 is now in the opened state.

However, if the agent wishes to transition a facility to a closed state, the agent may select the graphical element 511 corresponding to the facility to be closed. Such an action causes a close command to be sent to the facility 12, as described above to put the door lock 444 in the locked state and to turn off the sign 99. In addition, the state of the graphical element 509 for the facility 12 is changed to indicate that the facility 12 is now in the closed state.

Note that, if desired, the agent may change the open/close states of multiple facilities 12 at the same time rather than controlling such states individually for each facility 12. For example, in FIG. 15, the GUI 505 includes a graphical element 521 (e.g., icon), referred to hereafter as the "open all element." and a graphical element 522 (e.g., icon), referred to hereafter as the "close all element." If the open all element 521 is selected, then the system ensures that all of the facilities 12 of the displayed group of facilities 12 are controlled to be in the opened state. In this regard, for each facility 12 that is currently in the closed state, an open command is sent to the facility's site controller 325 from the agent's computing device 190 or the RAS controller 163, as described above, so that the sign 99 is illuminated and the door lock 444 is transitioned to the opened state. Thus, all of the facilities 12 of the group should be in the opened state, and the graphical elements 509 are updated as appropriate to indicate the opened state.

If the close all element 521 is selected, then the system ensures that all of the facilities 12 of the displayed group of facilities 12 are controlled to be in the closed state. In this regard, for each facility 12 that is currently in the opened state, a close command is sent to the facility's site controller 325 from the agent's computing device 190 or the RAS controller 163, as described above, so that the sign 99 is turned off and the door lock 444 is transitioned to the locked state. Thus, all of the facilities 12 of the group should be in the closed state, and the graphical elements 509 are updated as appropriate to indicate the closed state.

Note that it is unnecessary for the sign 99 to be turned off to indicate that the facility 12 is closed. For example, the sign 99 may be configured to change the message that is displayed based on the open/close state of the facility 12. When the facility 12 is in the opened state, the sign 99 may be controlled to read "Open," and when the facility is in the closed state, the sign 99 may be controlled to read "Closed." Such an effect could be achieved by changing the text of a digital display, by changing which components of the sign 99 are illuminated, or by other techniques. In addition, the site controller 325 may be configured to communicate with the sign directly (e.g., by Bluetooth or Wi-Fi) or through a local area network or other type of network without controlling the sign 99 through the PDU 77.

Figure 16:
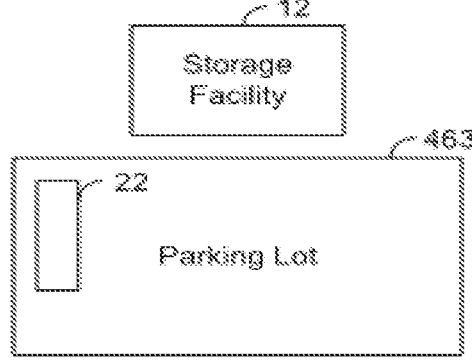
FIG. 16 is a block diagram illustrating a videoconferencing client located outside of a storage facility.
Figure 17:
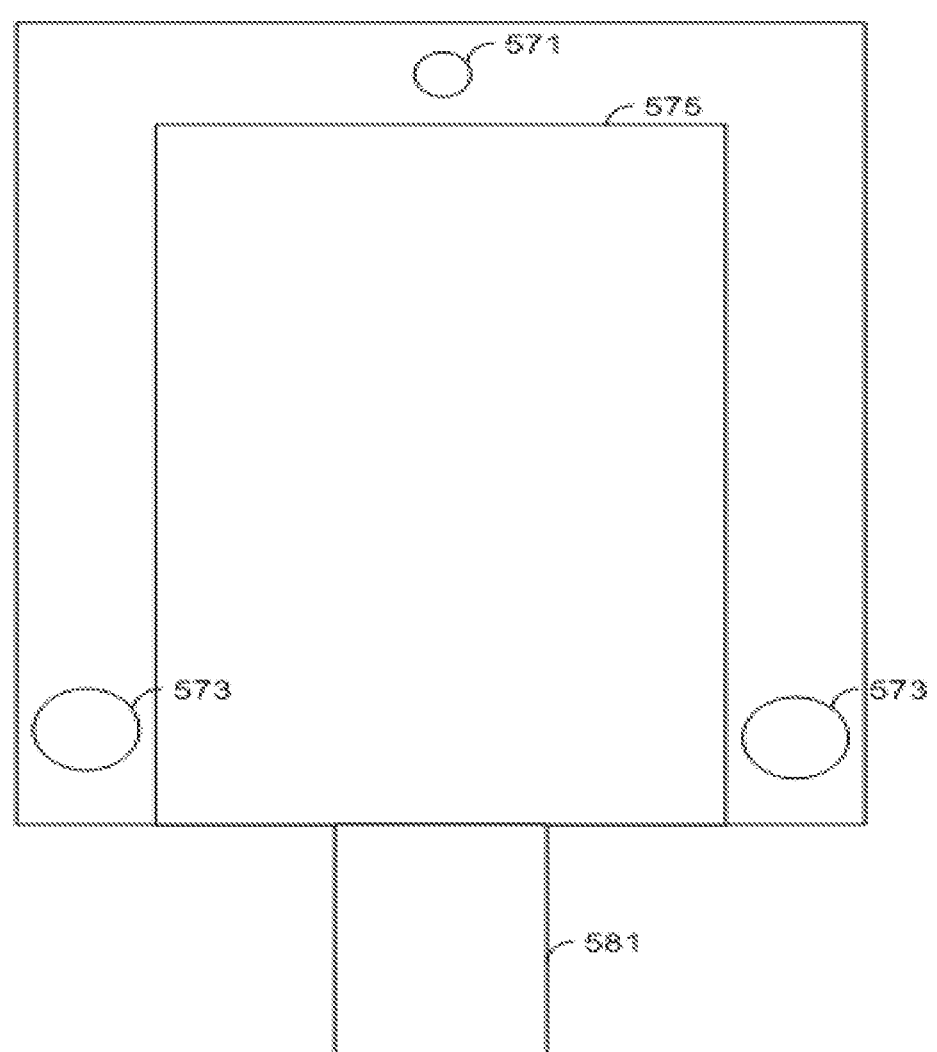
FIG. 17 depicts an exemplary videoconferencing client, such as is depicted by FIG. 16.

Note that the VC client 22 is described above as residing in a storage facility 12, such as within a main office of the facility 12. However, other locations of the VC client 22 are possible. As an example, FIG. 16 shows an embodiment for which a VC client 22 is located outside of a facility 12, such as outdoors in or near a parking lot 463 of the facility. Such VC client 22 could be positioned (e.g., next to a parking space) where a customer can drive up the VC client 22 and have a videoconferencing session while in his or her car, or the VC client 22 could be positioned (e.g., next to a sidewalk) where a customer can walk up to the VC client 22. The presence of the customer at or approaching the VC client 22 could be detected using proximity sensors or otherwise in order to proactively engage the customer through a videoconferencing call with an agent at the RAS 15, as described above for the embodiments where the VC client 22 is inside of the storage facility 12. FIG. 17 depicts an embodiment of the VC client 22 implemented outside of a facility 12.

As shown by FIG. 17, the VC client 22 has a display device 575 for displaying images (e.g., images of an agent at the RAS 15). The VC client 22 also has a plurality of speakers 573 for emitting sound and a camera 571 for capture images of the user at the VC client 22. The display device 575 and other components of the VC client 22 are supported by a base 581 that may be inserted into the ground or a structure. In some embodiments, a user may drive or walk up to the VC client 22 to initiate a videoconferencing call, as described above for other embodiments.

Figure 18:
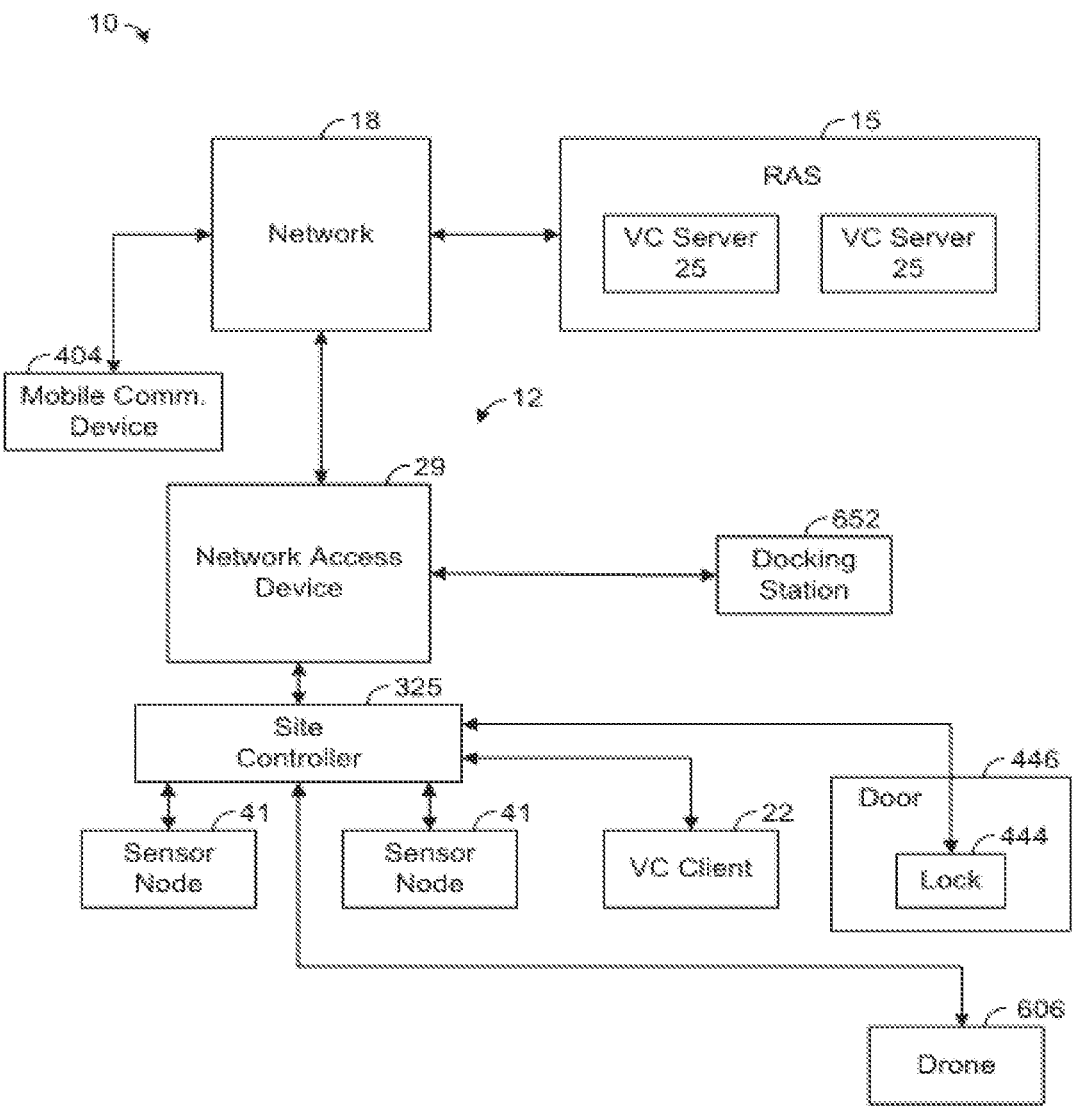
FIG. 18 is a block diagram illustrating an exemplary embodiment of a system, such as is depicted by FIG. 1, for enabling remote management of storage facilities.

Referring to FIG. 18, in some embodiments, the system 10 may include at least one autonomous drone 606 that is configured to monitor the facility and detect anomalies, as will be described in more detail below. The drone 606 may be configured (e.g., have one or more wheels or tracks) for traveling along the ground, or the drone 606 may be an aerial drone configured for flight (e.g., having one or more propellers for providing lift and directional control as in known in the art for conventional aerial drones).

Figure 19:
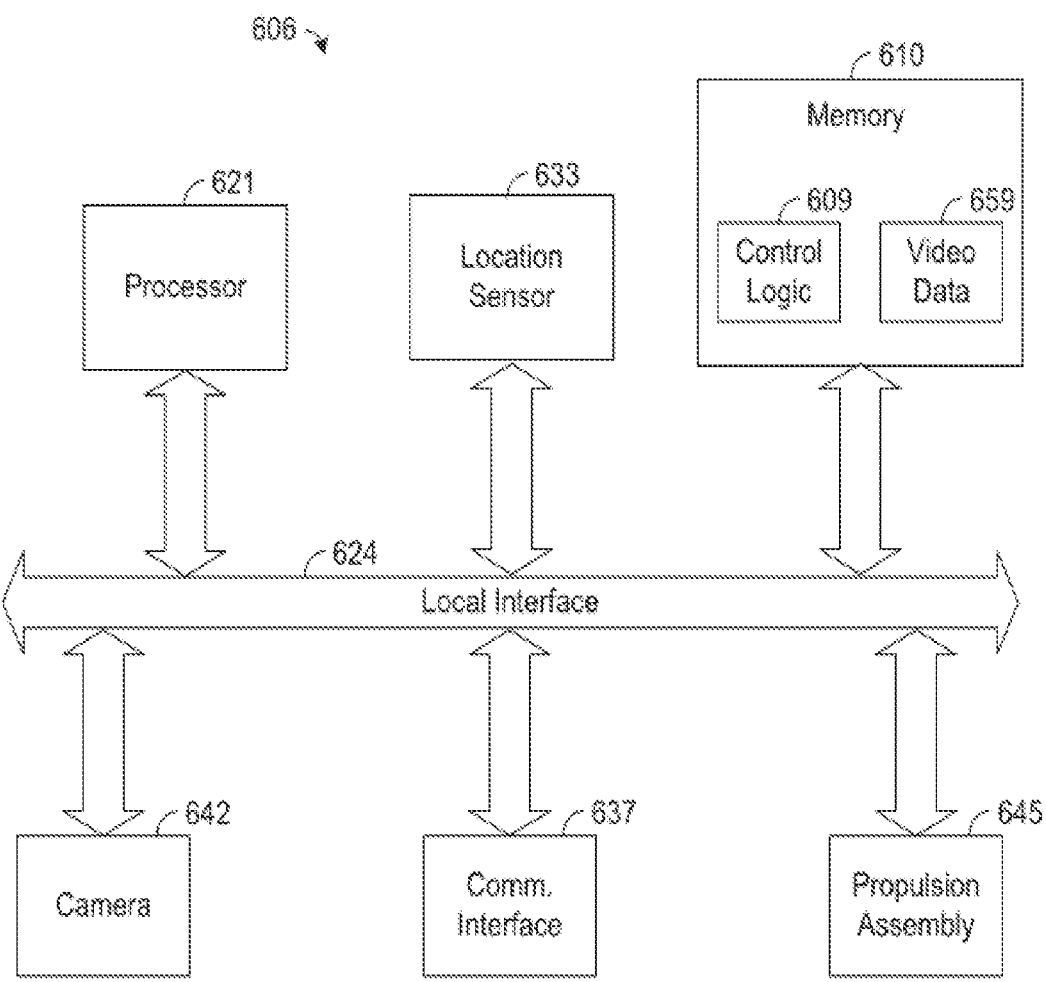
FIG. 19 is a block diagram illustrating an exemplary embodiment of a drone, such as is depicted by FIG. 18.

FIG. 19 depicts an exemplary embodiment of the drone 606. As shown by FIG. 19, the drone 606 comprises control logic 609 for generally controlling the operation of the drone 606, as will be described in more detail hereafter. The control logic 609 can be implemented in software, hardware, or any combination thereof. In the exemplary drone 606 illustrated by FIG. 19, the control logic 609 is implemented in software and stored in memory 610 of the drone 606.

The exemplary drone 606 depicted by FIG. 19 comprises at least one conventional processor 621, such as a digital signal processor (DSP) or a central processing unit (CPU), that communicates to and drives the other elements within the drone 606 via a local interface 624, which can include at least one bus. Furthermore, the drone 606 may have a communication interface 637 that is configured to communicate with external devices. As an example, the communication interface 637 may comprise a cellular transceiver for communicating with the network 18. The communication interface 637 may also comprise a short-range transceiver, such as Wi-Fi or Bluetooth, to communicate with components at a facility 12, such as the site controller 325 or a sensor node 41. The drone 606 may also have a location sensor 633, such as a GPS sensor, that may be used to determine the location of the device 606, and such location sensor 633 may be used to help navigate the drone 606. In some embodiments, the location sensor 633 may communicate with a local RF network and use triangulation or some other algorithm to determine the location of the sensor 633. Yet other types of location sensors are possible in other embodiments.

The drone 606 also has a camera 642 that is configured to capture images, such as a video stream. A propulsion assembly, including components for controlling directional movements of the drone 606, such as one or more propellers, may be used to move and navigate the drone 606 as may be desired. In other embodiments, the drone 606 may have other configurations as may be desired.

In some embodiments, the drone 606 is docked at a docking station 652 (FIG. 18) located at or close to the facility 12, and from time-to-time is configured to leave the docking station 652 and fly (or otherwise move) along a predefined path for monitoring the facility 12. While the drone 606 is flying (or otherwise traveling), the camera 642 is configured to capture video images of the facility 12, such as in or around the facility 12, and store such captured images as video data 659 (FIG. 18). Further, the control logic 609 is configured to analyze the images to detect certain anomalies. In some embodiments, the control logic 609 may a utilize machine learning algorithm to detect one or more anomalies (e.g., may be trained through conventional machine learning techniques, such as supervisory machine learning, in order detect anomalies of a certain type or types).

As an example, the control logic 609 may be configured to identify doors or doorways of storage units in the captured images and determine when a door is open. In this regard, the drone 606 may be flown after hours when storage units should be closed such that an opened door may be an anomaly for which it is desirable to generate an alert. In another example, the control logic 609 may be trained or otherwise configured to detect a presence of a human (e.g., an intruder), which also may be anomaly in certain situations, such as when the drone 606 is monitoring the facility 12 after hours when humans should not be present. In yet another example, the control logic 609 may be configured to detect the presence of trash in or around the storage facility 12, a gate that is opened or unlocked, or other types of anomalies for which it would be desirable to generate an alert.

In response such a detection of an anomaly, the control logic 609 may trigger an alert that is sent to the RAS 15 and communicated to an agent, as described above for other alerts. As an example, the control logic 609 may transmit an alert to the RAS 15 via the network 18 or otherwise, or the control logic 609 may notify the site controller 325, which may then determine whether an alert should be transmitted to the RAS 15. In addition, when triggering an alert, the control logic 609 may also transmit a portion of the video data 659 associated with the anomaly (e.g., showing the anomaly). Thus, when the agent receives an alert, the alert may include video data that may be viewed by the agent to ascertain whether the anomaly detection is correct and/or whether any action should be taken to address the anomaly. For example, the video data may be displayed to the agent so that he or she can see the anomaly from the displayed images and then decide what action to take.

As an example, assume that the control logic 609 detects an open door of a storage unit. Upon receiving an alert about the opened door, the agent may view video images of the opened door and then make decisions about whether any action should be taken. For example, if the video images show that the door has been damaged in a manner consistent with forced entry, the agent may decide to call security personnel or the police. If the door appears to have simply malfunctioned, the agent may decide to notify maintenance personnel who may then be dispatched to repair the door.

Once the drone 606 has completed its monitoring of the facility 12, the drone 606 may return to the docking station 652. In some embodiments, the docking station 652 may be communicatively coupled to the network 29 (e.g., via a cellular or other type of communication connection) and upload to the site controller 325 or the RAS 15 video data 659 and/or alerts generated by the control logic 609. Thus, alerts and video data 659 may be transmitted to the site controller 325 or the RAS 15 in real time while the drone 606 is flying or otherwise moving, or such information may be communicated through the docking station 652 after the drone 606 has returned to the docking station 652. Yet other techniques for communicating the video data 659 and/or alerts are possible.

In some embodiments, the control logic 609 for monitoring the video images and detecting anomalies may be external to the drone 606. As an example, the drone 606 may be configured to transmit the video images to the site controller 325 or the RAS 15, which then analyzes the images to detect anomalies and send notifications to agents as may be desired.

Now, therefore, the following is claimed:

1. A system for enabling remote management of storage facilities, comprising:

a videoconferencing (VC) client at a storage facility, the VC client having a display device, a camera, a microphone and a speaker;

a VC server at a location remote from the storage facility, the VC server having a display device, a camera, a microphone and a speaker, wherein the VC server is configured to establish VC calls with the VC client through a network;

a sensor configured to sense a presence of a first user at the storage facility;

at least one controller configured to generate a first alert based on the sensed presence of the first user, the at least one controller configured to store a list of agents for servicing alerts associated with storage facilities and select a first agent from the list for servicing the first alert based on an alert type for the first alert, the at least one controller further configured to transmit the first alert to a computing device associated with the first agent, wherein the alert type is defined by first information in the alert and indicates a type of event that triggered the first alert, and wherein the first alert includes second information defining a facility identifier identifying the storage facility; and the computing device configured to display a graphical user interface indicative of the first alert for prompting the first agent to accept the first alert, wherein the computing device in response to a user input for accepting the first alert is configured to communicate with the VC server for initiating a VC call between the VC server and the VC client.

2. The system of claim 1, wherein the computing device is configured to communicate with the VC server via an application programmatic interface.

3. The system of claim 1, wherein the at least one controller is configured to receive an identifier for identifying the first user from a mobile communication device of the first user, and wherein the at least one controller is configured to select the first agent based on the identifier.

4. The system of claim 1, wherein the at least one controller is configured to select the first agent based on the facility identifier.

5. The system of claim 4, wherein the list includes a group of agents associated with the facility identifier, and wherein the at least one controller is configured to select the first agent from the associated group based on the alert type of the first alert.

6. The system of claim 5, wherein the at least one controller is configured to receive an identifier for identifying the first user from a mobile communication device of the first user, and wherein the at least one controller is configured to select the first agent based on the identifier for identifying the first user.

7. The system of claim 1, wherein the VC client is located outside.

8. The system of claim 1, wherein the at least one controller is configured to generate a second alert in response to detection of a problem with unlocking a lock for a storage unit at the storage facility, wherein the at least one controller is configured to select an agent from the list for servicing the second alert, and wherein the at least one controller is configured to transmit the second alert to a computing device associated with the agent selected for servicing the second alert.

9. The system of claim 1, wherein the at least one controller is configured to track the first user at the storage facility and determine the alert type based on tracking of the first user by the at least one controller.

10. The system of claim 1, wherein the at least one controller is configured to determine a location of the first user at the storage facility and determine the alert type based on the location of the first user determined by the at least one controller.

11. A method for enabling remote management of storage facilities, comprising:

sensing, with at least one sensor, a presence of a first user at a storage facility;

generating a first alert based on the sensed presence of the first user;

storing, in memory, a list of agents for servicing alerts associated with storage facilities;

selecting a first agent from the list for servicing the first alert based on an alert type for the first alert, wherein the alert type is defined by first information in the alert and indicates a type of event that triggered the first alert, and wherein the alert includes second information defining a facility identifier identifying the storage facility;

transmitting the first alert to a computing device associated with the selected first agent;

displaying a graphical user interface indicative of the first alert to the first agent for prompting the first agent to accept the first alert;

in response to a user input for accepting the first alert, initiating a video conferencing (VC) call between a VC server and a VC client through a network, wherein the VC client is at the storage facility and has a display device, a camera, a microphone, and a speaker, and wherein the VC server is a location remote from the storage facility and has a display device, a camera, a microphone, and a speaker.

12. The method of claim 11, further comprising receiving an identifier for identifying the first user from a mobile communication device of the first user, wherein the selecting is based on the identifier.

13. The method of claim 11, wherein the selecting is based on the facility identifier.

14. The method of claim 13, wherein the list includes a group of agents associated with the facility identifier, and wherein the selecting comprises selecting the first agent from the associated group based on the alert type of the first alert.

15. The method of claim 14, further comprising receiving an identifier for identifying the first user from a mobile communication device of the first user, wherein the selecting is based on the identifier for identifying the first user.

16. The method of claim 11, wherein the VC client is located outside.

* * * * *